United States Patent
Shikibu

(10) Patent No.: US 12,461,858 B2
(45) Date of Patent: Nov. 4, 2025

(54) PROCESSOR

(71) Applicant: Fujitsu Limited, Kawasaki (JP)

(72) Inventor: Takahiro Shikibu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/818,781

(22) Filed: Aug. 29, 2024

(65) Prior Publication Data

US 2025/0094349 A1  Mar. 20, 2025

(30) Foreign Application Priority Data

Sep. 14, 2023  (JP) ................................. 2023-149635

(51) Int. Cl.

| | |
|---|---|
| *G06F 12/0811* | (2016.01) |
| *G06F 9/38* | (2018.01) |
| *G06F 12/0815* | (2016.01) |
| *G06F 12/0855* | (2016.01) |
| *G06F 12/0862* | (2016.01) |

(52) U.S. Cl.
CPC ........ *G06F 12/0815* (2013.01); *G06F 9/3842* (2013.01); *G06F 12/0811* (2013.01); *G06F 12/0855* (2013.01); *G06F 12/0862* (2013.01); *G06F 2212/1024* (2013.01); *G06F 2212/507* (2013.01)

(58) Field of Classification Search
None
See application file for complete search history.

(56) References Cited

U.S. PATENT DOCUMENTS

| | | | | |
|---|---|---|---|---|
| 6,321,296 B1* | 11/2001 | Pescatore | ............ | G06F 12/0811 |
| | | | | 711/E12.024 |
| 6,963,967 B1* | 11/2005 | Guthrie | ................. | G06F 9/3861 |
| | | | | 712/225 |
| 2008/0147977 A1* | 6/2008 | Toussi | ................. | G06F 12/0897 |
| | | | | 711/E12.043 |
| 2012/0102269 A1* | 4/2012 | Ono | ..................... | G06F 12/0862 |
| | | | | 711/E12.024 |

(Continued)

FOREIGN PATENT DOCUMENTS

| | | |
|---|---|---|
| JP | 2009-64471 A | 3/2009 |
| JP | 2014-503929 A | 2/2014 |
| WO | 2004/061678 A2 | 7/2004 |

*Primary Examiner* — Kaushikkumar M Patel
(74) *Attorney, Agent, or Firm* — Fujitsu Intellectual Property Center

(57) ABSTRACT

The processor includes core circuits and a cache unit having L2 to LN caches (N is 3 or more). L1 cache has a move-in buffer including entries in which memory access instruction resulted in cache miss in L1 cache is stored. The move-in buffer, when issuing a normal memory request to L2 cache, issues a pseudo memory request to L3 to LN caches in parallel and receives a pseudo data response that has coherency-unsecured data from any one cache. The re-order buffer executes a normal instruction execution completion process in response to the normal data response, executes a pseudo instruction execution completion process in response to the pseudo data response, and, when the pseudo data response is a failure, rewinds an arithmetic operation circuit that speculatively executed instructions after the memory access instruction in response to the pseudo instruction execution completion process, back to a state before the speculative execution.

7 Claims, 17 Drawing Sheets

(56) References Cited

U.S. PATENT DOCUMENTS

| | | | |
|---|---|---|---|
| 2013/0246708 A1* | 9/2013 | Ono | G06F 12/0862 |
| | | | 711/E12.024 |
| 2013/0268735 A1 | 10/2013 | Gibert Codina et al. | |
| 2017/0308483 A1* | 10/2017 | Ishii | G06F 12/0806 |
| 2019/0377576 A1* | 12/2019 | Akizuki | G06F 9/30058 |
| 2020/0301838 A1* | 9/2020 | Sinha | G06F 12/0868 |
| 2020/0401523 A1* | 12/2020 | Sinha | G06F 12/0811 |

* cited by examiner

FIG. 3

| | INSTRUCTION | DESCRIPTION |
|---|---|---|
| 01 | Load MEM[A] | LOAD DATA OF ADDRESS A |
| 02 | ...... | DEPENDENT CALCULATION DEPENDING ON RESULT OF Load MEM[A] |
| 03 | NC-Load | CHECK STATUS REPRESENTING WHETHER DATA OF Load MEM[B]-Store MEM[E] CAN BE READ |
| 04 | ...... | PROCESS THAT IS WAITING FOR STATUS |
| 05 | Sync(FENCE) | BARRIER INSTRUCTION (PERMITS ISSUANCE OF NEXT INSTRUCTIONS AFTER PREVIOUS INSTRUCTIONS ARE COMPLETED |
| 06 | Load MEM[B] | LOAD DATA OF ADDRESS B |
| 07 | Load MEM[C] | LOAD DATA OF ADDRESS C |
| 08 | Load MEM[D] | LOAD DATA OF ADDRESS D |
| 09 | ...... | DEPENDENT CALCULATION DEPENDING ON RESULT OF Load MEM[B]-Load MEM[D] |
| 10 | Store MEM[E] | STORE CALCULATION RESULT OF 09 IN ADDRESS E (IT IS AN ISSUE IN QUICKENING EXECUTION COMPLETION OF THE INSTRUCTION) |

FIG. 13

MIB
(Move IN BUFFER)

| MEMORY ACCESS INSTRUCTION INFORMATION | R MEMORY REQUEST INFORMATION | P MEMORY REQUEST INFORMATION | R DATA RESPONSE$, DATA, FLAG | P DATA RESPONSE$, DATA, FLAG | P MEMORY REQUEST SUCCESS FLAG |
|---|---|---|---|---|---|
| IID1, LD, ADD1 | R_RQ1 | P_RQ1, $ | L2, D1, R_CMP | INV | INV |
| IID2, LD, ADD2 | R_RQ2 | P_RQ2, $ | L2, D2, R_CMP | L3, PD3, P_CMP | FAILURE |
| IID3, LD, ADD3 | R_RQ3 | P_RQ3, $ | INV | L3, PD3, P_CMP | NA |
| IID4, LD, ADD4 | R_RQ4 | P_RQ4, $ | INV | L3, PD4, P_CMP | NA |

FIG. 15

ROB
(RE-ORDER BUFFER)

| INSTRUCTION STRING | INSTRUCTION RE-EXECUTION INFORMATION | R COMPLETION FLAG | P COMPLETION FLAG | P COMMIT FLAG | SUCCESS/FAILURE, RE-EXECUTION |
|---|---|---|---|---|---|
| IID1, INST1 | REXC_INF1 | R_CMP | P_CMP | P_CMT | FAILURE, REXC |
| IID2, INST2 | REXC_INF2 | R_CMP | P_CMP | P_CMT | SUCCESS |
| IID3, INST3 | REXC_INF3 | R_CMP | INV | INV | INV |
| IID4, INST4 | REXC_INF4 | INV | INV | INV | INV |

FIG. 17

| | INSTRUCTION | DESCRIPTION |
|---|---|---|
| 01 | ldr x0, [x9] | LOAD DATA OF ADDRESS x9 IN REGISTER x0 |
| 02 | add x1, x0, #8 | ADD 8 TO DATA OF REGISTER x0 AND STORE RESULT IN REGISTER x1 |
| 03 | ldr x2, [x1] | LOAD DATA OF ADDRESS x1 IN REGISTER x2 |

PROCESSOR

CROSS-REFERENCE TO RELATED APPLICATION

This application is based upon and claims the benefit of priority of the prior Japanese Patent Application No. 2023-149635, filed on Sep. 14, 2023, the entire contents of which are incorporated herein by reference.

FIELD

The present invention relates to a processor.

BACKGROUND

An arithmetic operation processing device is a processor or a central processing unit (CPU) chip. Hereinafter, the arithmetic operation processing device will be referred to as a processor. In recent years, processors have had a problem of an increased latency in memory access (the number of clocks from a memory request to a data response) due to the addition of multiple functions and miniaturization. In particular, although the large-scale integration of circuits through miniaturization enables an increase in the number of cores and the expansion of cache hierarchy, it is requested to suppress an accompanying increase in the latency.

In Japanese Translation of PCT Application No. 2014-503929 and Japanese Patent Application Publication No. 2009-64471 A2, it is described that data is stored in a cache speculatively in speculative execution of instructions.

SUMMARY

On the other hand, in accordance with implementation of multiple cores and multi-layered cache hierarchy, it is needed to secure cache coherency, which represents consistency of data within a cache. A cache has a data memory that stores data and a tag memory that stores the state of each cache line in the data memory or a state of data in the cache line and the like and determines whether or not coherency of the data is secured based on the state thereof. For example, in an MESI protocol, as such states, four states including I (the cache line is invalid), S (content of the cache line is the same as that of the memory and can be shared by caches of other cores), E (content of the cache line is the same as that of the memory and is not present in caches of other cores), and M (content of the cache line has been changed due to write and does not coincide with that of the memory) are used.

An example of the procedure for securing cache coherency will be described below. In a case in which a certain core 0 tries to read a memory of a certain address, and a cache miss occurs in the cache thereof, there may be latest data to be rewritten into a cache of another core 1, and old content of a memory may be maintained. Thus, the core 0 broadcasts to caches of other cores including the core 1 and requests the cores to, in a case where there is a cache line of an M state of the address thereof, write back (copy back) the data of M state into the memory. In response to this, the cache of the core 1 copies back content in the cache line of the M state into the memory, changes the M state to an S state, and gives a response of "having a cache line of the S state" to the core 0. Thereafter, the core 0 reads the latest data of the address from the memory, stores the data in its own cache, and sets the cache line to be in the S state. On the other hand, in a case where the cache of the core 1 does not have a cache line of the address for a request for copying back data from the core 0, the core 1 gives a response of "not having a cache line of the address" to the core 0. In response to this, the core 0 reads data of the address from the memory, stores the data in its own cache, and sets the cache line thereof to be in an E state.

In this way, the procedure for securing cache coherency is a procedure in which consistency of data is taken among caches of a plurality of cores, and the true or latest data, that is, latest data, can be read. In a case where cache coherency is not secured, the procedure of securing coherency as described above needs to be performed.

Thus, the procedure for securing cache coherency may cause an increase in latency. Until the procedure for securing coherency is completed, the processor locks a subsequent memory request that depends on the memory request. For this reason, in a case where the latency is long, subsequent memory requests are unable to start, and the processing efficiency of the processor is decreased.

In order to avoid a decrease in the processing efficiency described above, memory access to an address predicted to be executed next is speculatively executed using a branch prediction mechanism of a branch instruction or a prefetch mechanism. However, in speculative execution, it is needed to roll the circuit back to a state before the speculative execution at the time of a speculation failure. A speculative execution area that can be rewound, for example, is limited to an area from a decoder to an arithmetic unit and a register file, and it is prohibited to store data of which speculative execution has not been determined in a cache area. For this reason, during the procedure in which a memory request of an instruction that is a speculative execution target secures coherency, execution of a subsequent memory request depending on the memory request is locked, and thus a subsequent memory request is unable to speculatively executed. As a result, improvement of program execution efficiency according to speculative execution of an instruction is inhibited.

A processor comprising: a plurality of core circuits each having an arithmetic operation circuit executing an issued instruction, a load store unit that executes an issued memory access instruction, a level 1 cache, and a re-order buffer that controls an instruction execution completion process of the arithmetic operation circuit and the load store unit; and a cache unit having a plurality of caches from a level 2 cache to a level N cache, N being an integer equal to or greater than 3, wherein the level 1 cache has a move-in buffer that has a plurality of entries in which a memory access instruction that results in a cache miss in the level 1 cache is stored, wherein the move-in buffer issues a normal memory request, which performs memory access of the memory access instruction that results in the cache miss, to the level 2 cache, the normal memory request being issued from the level 2 cache to the level N cache serially, and receives a normal data response that has coherency-secured data from any one of the level 2 cache to the level N cache in which the normal memory request result in a cache hit, wherein, when the normal memory request is issued to the level 2 cache, a pseudo memory request that performs the memory access is issued to a level 3 cache in a case where N is 3, or the pseudo memory request is issued to the level 3 cache to the level N cache in parallel in a case where N is 4 or more, wherein the move-in buffer receives a pseudo data response that has coherency-unsecured data from any one cache in which the pseudo memory request result in a cache hit, and wherein the re-order buffer executes a normal instruction execution completion process in response to the normal data response, executes a pseudo instruction execution completion process in response to the pseudo data response, and, when the pseudo data response is a failure, rewinds the arithmetic operation circuit, which speculatively executed an instruction after the memory access instruction that result in the cache miss in response to the pseudo instruction execution completion process, back to a state before the speculative execution.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating one example of instruction strings in which a process for securing coherency in caches inhibits speculative execution.

FIG. 13 is a diagram illustrating a buffer configuration example of the move-in buffer MIB.

FIG. 15 is a diagram illustrating a buffer configuration example of the re-order buffer ROB according to this embodiment.

FIG. 17 is a diagram illustrating an example of an instruction string different from that illustrated in FIG. 3.

DESCRIPTION OF EMBODIMENTS

Figure 1:
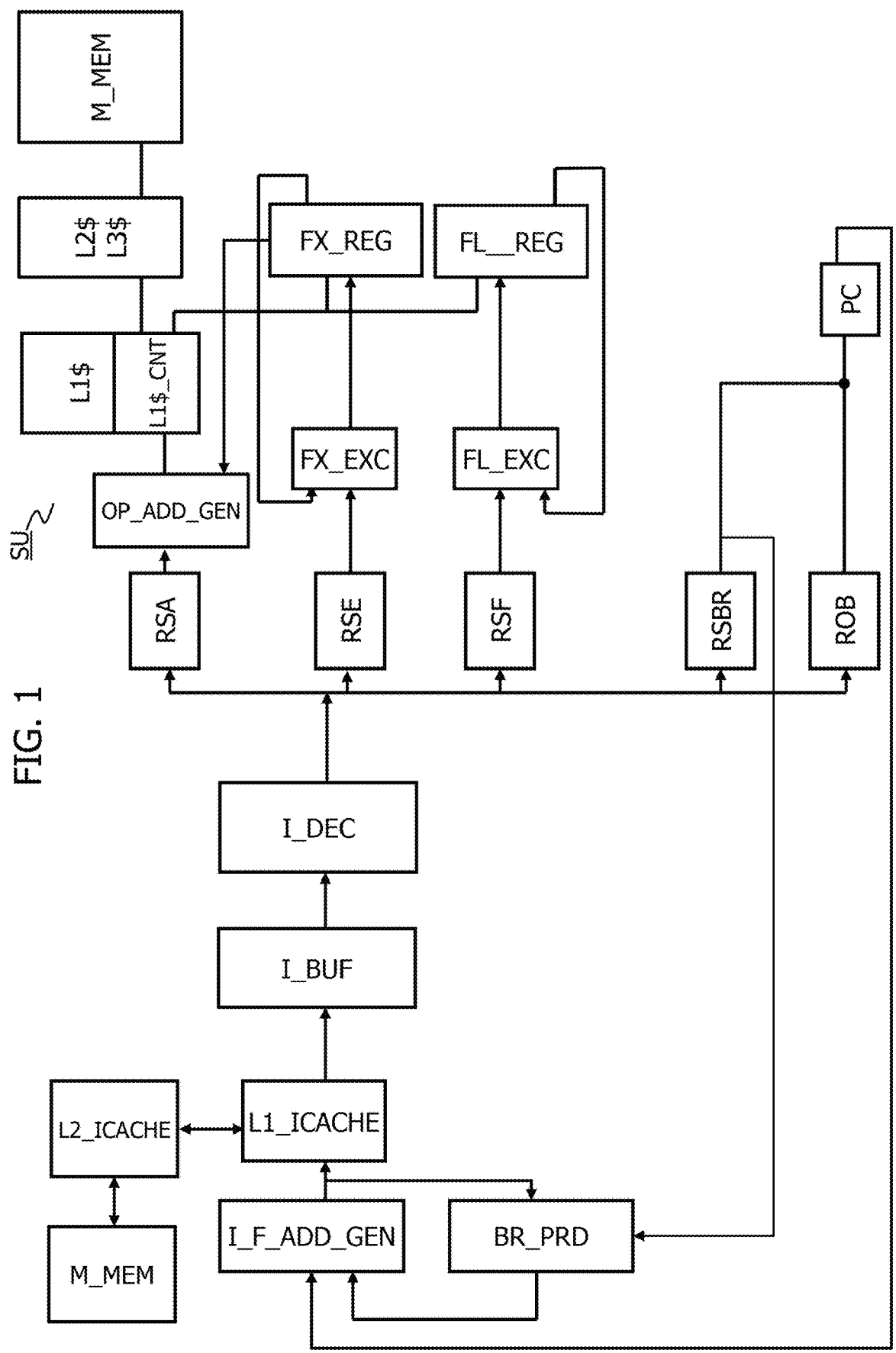
FIG. 1 is a diagram illustrating a configuration example of a processor according to this embodiment.

FIG. 1 is a diagram illustrating a configuration example of a processor according to this embodiment. The processor illustrated in FIG. 1 has an instruction fetch address generator I_F_ADD_GEN as an instruction issuing portion, a primary instruction cache L1_ICACHE, a secondary instruction cache L2_ICACHE, an instruction buffer I_BUF, an instruction decoder I_DEC, and reservation stations RSA, RSE, and RSF that are instruction issuing portion issuing a plurality of instructions to an arithmetic unit. In addition, the instruction issuing portion has a reservation station RSBR for a branch instruction and a re-order buffer ROB.

Furthermore, the processor has a storage unit SU, a fixed point arithmetic unit FX_EXC, and a floating point arithmetic unit FL_EXC as a plurality of arithmetic units. One or a plurality of such arithmetic units are included.

The storage unit SU has an operand address generator OP_ADD_GEN including addition/subtraction circuits used for calculating an address, a primary data cache L1$, and a secondary data cache L2$. The primary data cache has a level 1 cache control portion L1$_CNT performing control for a cache memory in addition to a data memory. The level 1 cache control portion, for example, is configured using a pipeline circuit. The secondary data cache has a similar configuration to the primary data cache.

In addition, each of the fixed point arithmetic unit FX_EXC and the floating point arithmetic unit FL_EXC, for example, has addition/subtraction circuits, an arithmetic logic unit, a multiplier, and the like. The floating point arithmetic unit, for example, has arithmetic units of a number corresponding to a single instruction multiple data (SIMD) width such that a SIMD arithmetic operation can be performed. The processor has a fixed point register file FX_REG and a floating point register file FL_REG that store processing results of such arithmetic units. Such a register file has a plurality of registers, some of which are a renaming register in which a processing result is stored before completion of an instruction and an architecture register in which a processing result is stored at the time of completion of an instruction. The architecture register is a register that can be accessed from software and is a general-purpose register.

The configuration of the core in the processor has been described above. The processor additionally has a level 3 data cache L3$ shared among a plurality of cores and is connected to a main memory M_MEM through a memory controller not illustrated in the drawing. In addition, the secondary instruction cache L2_ICACHE is also connected to the main memory M_MEM through a memory controller.

The entire configuration of the processor will be described below in accordance with the flow of processes of instructions. The instruction fetch address generator I_F_ADD_GEN generates a fetch address, reads a fetched instruction from the primary instruction cache L1_ICACHE in an execution order (in order) of the program, and stores the fetched instruction in the instruction buffer I_BUF once. Then, the instruction decoder I_DEC inputs and decodes fetched instructions stored in the instruction buffer in order and generates an executable instruction (execution instruction) with information needed for execution thereto.

Next, execution instructions generated by the instruction decoder are queued into a storage having a queue structure called a reservation station in order. The reservation station is an execution queue accumulating execution instructions in the queue and is provided for each arithmetic unit executing instructions.

The reservation station, for example, has a reservation station for address generation (RSA) provided in the storage unit SU including the primary data cache L1$, a reservation station for execution (RSE) provided in the fixed point arithmetic unit FX_EXC, and a reservation station for floating point (RSF) provided in the floating point arithmetic unit FL_EXC (RSE). In addition, the reservation station has a reservation station for branch (RSBR) that corresponds to a branch predicting unit BR_PRD. Hereinafter, "reservation station" will be appropriately abbreviated to "RS" in the description.

Then, an execution instruction queued in each RS is issued to an arithmetic unit in no execution order (out of order) and is executed by the arithmetic unit in accordance with satisfaction of execution conditions of the instruction such as whether or not an input operand needed for instruction execution can be read from a general-purpose register file in accordance with the completion process of an arithmetic operation process of the previous instruction (whether or not a read after write (RAW) restriction is satisfied), whether or not circuit resources of the arithmetic unit can be used, and the like.

Meanwhile, the instruction decoder I_DEC assigns an instruction identification (IID) to an execution instruction that is generated by decoding a fetched instruction in order of execution of the program and transmits the execution instruction to a re-order buffer (ROB) in order of execution. The re-order buffer ROB has a storage having a queue structure storing transmitted execution instructions in order and an instruction commit processing unit that performs commit processing (completion processing) of each instruction based on information in the queue and the like in response to a processing completion report of the instruction from a pipeline circuit of the arithmetic unit. In other words, the ROB executes completion processing of an instruction executed out of order (in a non-program order) in order (in order of the program).

Furthermore, the re-order buffer ROB stores a speculative execution instruction that is speculatively executed in a storage having a queue structure and, in a case where the speculative execution has failed, executes a process of rewinding a retriable area (a speculation executable area) back to a state before the speculative execution. For this reason, the re-order buffer ROB has a buffer (a storage having the queue structure described above) that stores information needed for re-execution of the instruction of which the speculation execution has failed such as an instruction string that is being speculatively executed, a flag, a parameter, data, and the like thereof. The speculation executable area, for example, represents circuits from the instruction fetch address generating circuit I_F_ADD_GEN to the arithmetic unit and the register.

The ROB stores execution instructions in the queue provided in the ROB in order and waits for a processing completion report of an instruction from each arithmetic unit. Then, each RS transmits an instruction that has been prepared for execution to the arithmetic unit out of order, so that the instruction is executed by the arithmetic unit. Thereafter, when a processing completion report of an instruction is transmitted from the arithmetic unit to the ROB, the instruction commit processing unit of the ROB performs completion processing (commit processing) of an instruction that is the oldest in a program order among instructions of which processing completion reports has being transmitted in the queue in order and performs update of circuit resources such as a register and a cache and the like. In the completion processing, the ROB releases circuit resources used in the execution of the completed instruction, releases an entry in the ROB and increments a program counter PC.

A branch instruction queued in the reservation station for branch processing RSBR is predicted to be branched by the branch predicting unit BR_PRD, and the instruction fetch address generator I_F_ADD_GEN generates a branch destination address based on a result of the prediction. As a result, an instruction based on the branch prediction is read from the instruction cache and is speculatively executed by the arithmetic unit after passing through the instruction buffer and the instruction decoder. Although a branch instruction is executed in order, the RSBR predicts a branch destination before a branch destination of the branch instruction is determined and speculatively executes an instruction of the prediction branch destination. When the branch prediction is correct, the processing efficiency is raised. On the other hand, when the branch prediction is incorrect, the instruction that has been speculatively executed is canceled in the pipeline, and thus the processing efficiency is lowered.

Figure 2:
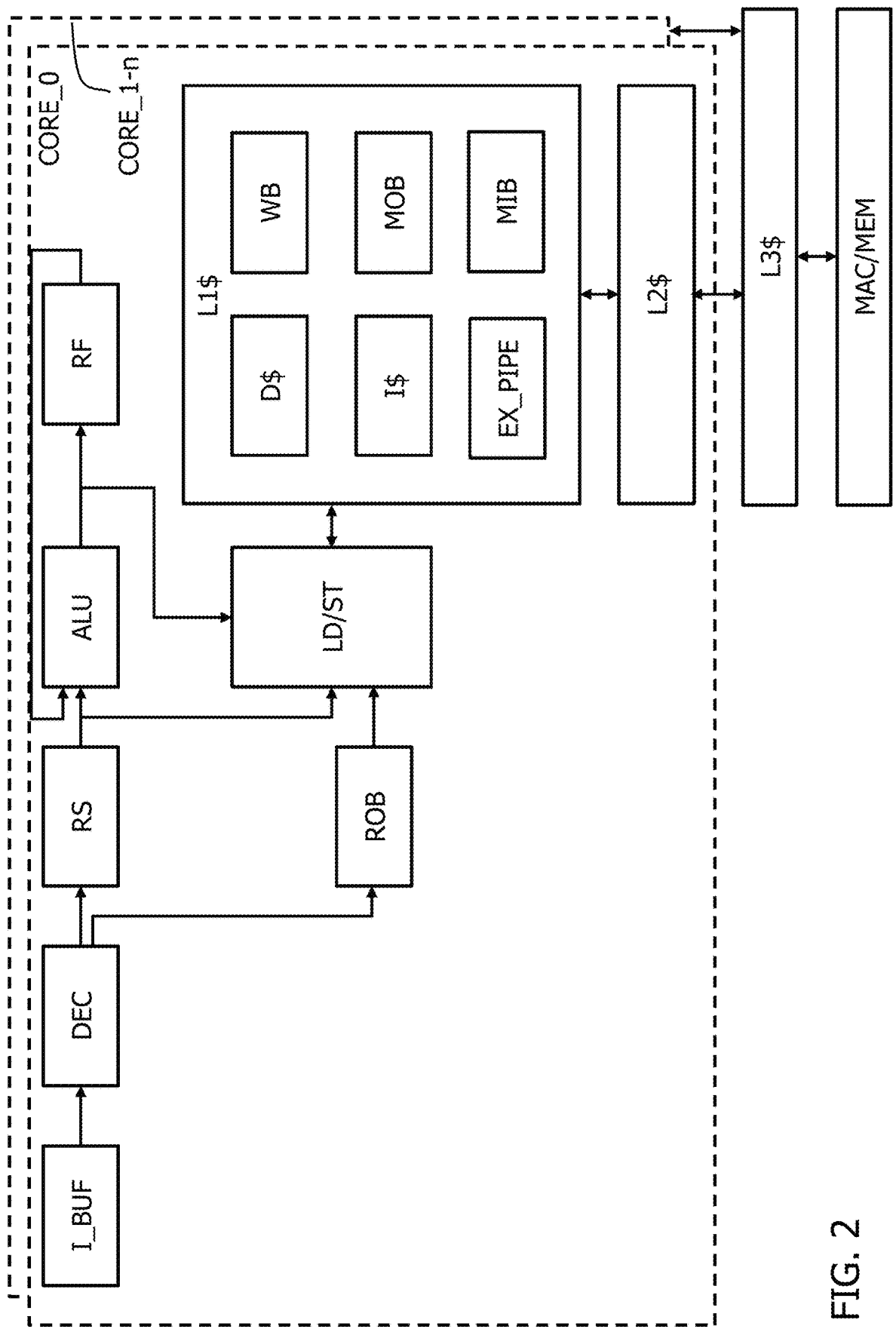
FIG. 2 is a diagram illustrating a configuration example of a multi-core processor.

FIG. 2 is a diagram illustrating a configuration example of a multi-core processor. In the example illustrated in FIG. 2, the number of cores is n (n is a positive integer). The configuration of a core CORE_0 is similar to that of the other cores CORE_1 to CORE_n-1. Although the configuration of each core is similar to that illustrated in FIG. 1, an instruction buffer I_BUF, a decoder I_DEC, a reservation station RS, a register file RF including an architecture register, a re-order buffer ROB, a load store unit LD/ST, a level 1 cache L1$, and a level 2 cache L2$ are included in FIG. 2. Here, the instruction fetch address generating circuit I_F_ADD_GEN, the branch predicting unit BR_PRD, the branch reservation station RSBR corresponding thereto, and the like illustrated in FIG. 1 are omitted in FIG. 2.

The multi-core processor additionally has a level 3 cache L3$ shared among multiple cores and a memory access controller MAC controlling access to the memory MEM. The level 1 cache L1$ has a data cache D$, an instruction cache I$, a pipeline circuit EX_PIPE controlling the level 1 cache, a write buffer WB, a move-out buffer MOB, and a move-in buffer MIB. The write buffer WB stores write data of a store instruction. The move-out buffer MOB stores eviction data at the time of evicting data in the level 1 cache to the level 2 cache or the like. In a case where a cache miss has occurred in the level 1 cache, the move-in buffer MIB stores data acquired by a memory request issued to the level 2 cache or less. For this reason, a signal path is formed for a data response from the level 3 cache L3$ to the move-in buffer MIB in the level 1 cache L1$. See FIGS. 6 and 9. In FIG. 2, this signal path is omitted.

Although the multi-core processor illustrated in FIG. 2 has the level 1 cache L1$, the level 2 cache L2$, and the level 3 cache L3$, the processor may additionally have a level 4 cache, a level 5 cache, and caches of subsequent levels.

FIG. 3 is a diagram illustrating one example of instruction strings in which a process for securing coherency in caches inhibits speculative execution. A row number of an instruction string is represented at a left end. Row number 01 represents a load instruction reading data of Address A in the memory. Row number 02 represents an arbitrary instruction executing calculation depending on a result of the load instruction of Row number 01. Row number 03 represents a non-cache load instruction that is for reading data of a device or the like other than a cache and represents an example of an instruction that is for checking a status representing whether data of load instructions of Row numbers 06 to 10 can be read. The non-cache load instruction does not depend on instructions of Row numbers 01 and 02. Row number 04 represents an instruction for monitoring whether the above-described status becomes readable. Row number 05 represents a barrier instruction for monitoring whether a previous instruction has been completed and permitting issuance of a subsequent instruction at the time of completion. Row numbers 06 to 08 are load instructions for reading data of Addresses B to D in the memory. Row number 09 is an instruction for executing calculation depending on results of the three load instructions described above. Row number 10 is a store instruction for writing a calculation result of the instruction of Row number 09 into Address E inside of the memory and is executed after completion of the instruction of Row number 09. In the instruction strings illustrated in FIG. 3, it is an object to complete the execution of the store instruction of Row number 09.

The following description of this embodiment shows that the problem that the process of securing coherency in caches in a load instruction in the instruction string illustrated in FIG. 3 inhibits improvement of program execution efficiency according to speculative execution of an instruction after the load instruction is solved.

Figure 4:
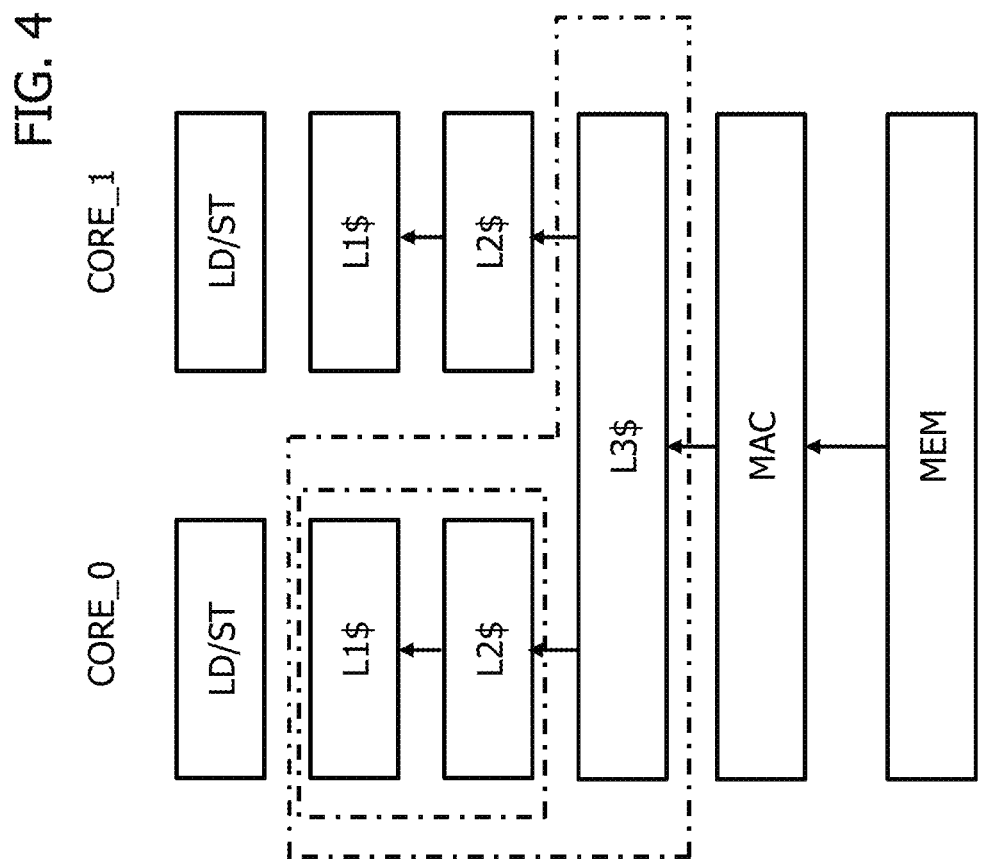
FIG. 4 illustrates a structure of a cache called an inclusion cache.
Figure 5:
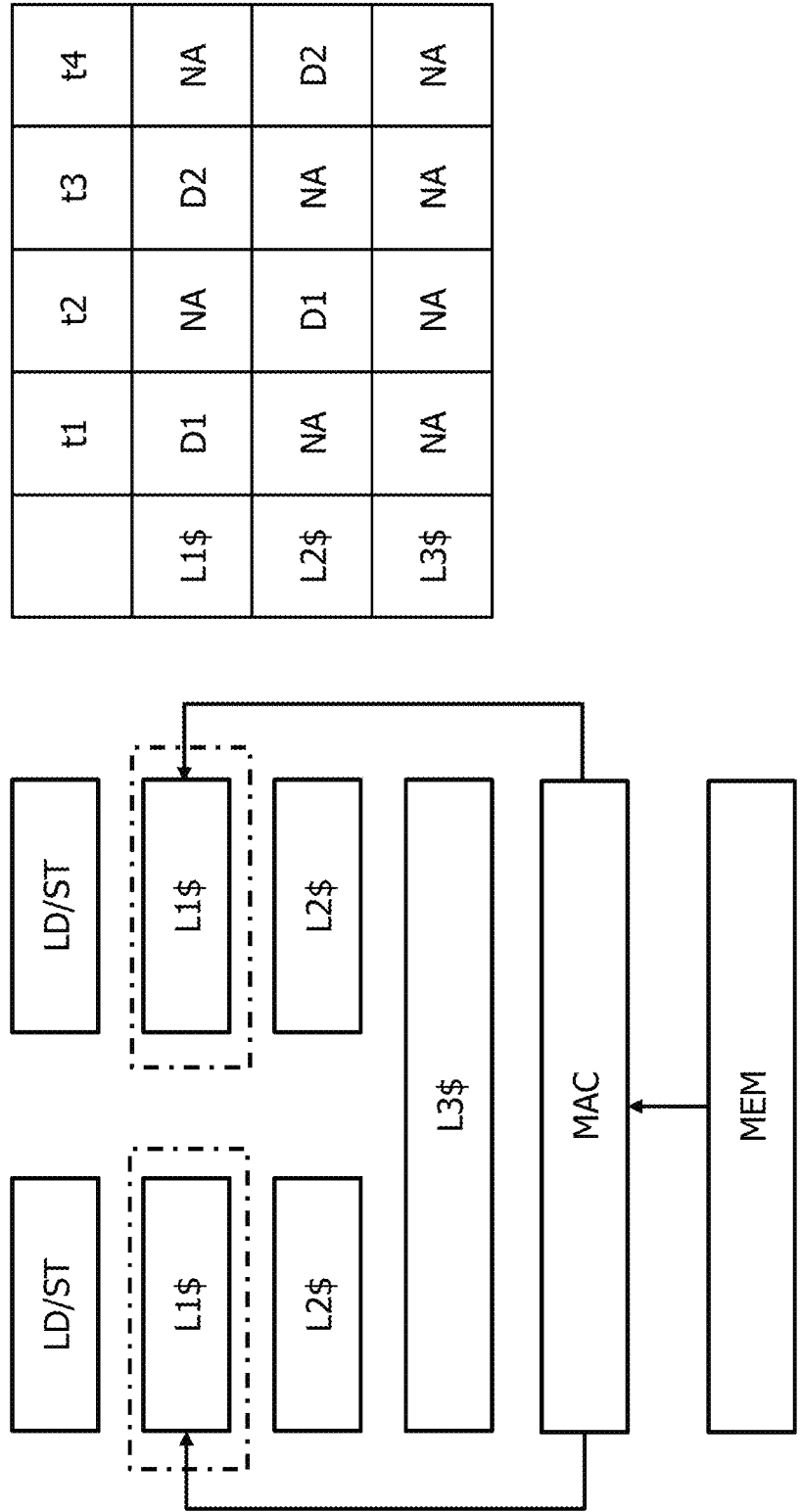
FIG. 5 illustrates a structure of a cache called a victim cache.

FIGS. 4 and 5 are diagrams illustrating a structure of caches and a sequence for reading latest data using memory requests. These will be described as a background technology of the processor according to this embodiment.

FIG. 4 illustrates a structure of a cache called an inclusion cache. In this example, each of two cores CORE_0 and CORE_1 has a load store unit LD/ST, a level 1 cache L1$, and a level 2 cache L2$, and the cores CORE_0 and CORE_1 share a level 3 cache L3$. The level 3 cache L3$ is connected to a memory access controller MAC, and the memory access controller MAC controls access to a memory MEM.

In the inclusion cache, for example, the load store unit LD/ST of the core CORE_0 stores data read from the memory MEM into the level 3 cache L3$, the level 2 cache L2$, and the level 1 cache L1$ in order of proximity to the memory. This similarly applies to the case of the core CORE_1. In the inclusion cache, cache control is performed such that content of the level 1 cache L1$ is also present in the level 2 cache L2$, and content of the level 2 cache L2$ is also present in the level 3 cache L3$. In the drawing, dashed dotted lines represent a range in which data present in the inclusion cache is registered to be common.

A table illustrated on the right side in the drawing represents an example of transitions of data stored in caches of three levels L1$ to L3$ for each time. At a time t1, for example, as a result of execution of a load instruction using the load store unit of the core CORE_0, data D1 read from the memory is stored in all the caches L1$ to L3$. Thereafter, at a time t2, as a result of execution of another load instruction using the load store unit of the core CORE_0, the data D1 is evicted from the cache L1$ into the cache L2$, and other data is stored in the cache L1$, whereby the data D1 is not stored in the cache L1$ (NA).

After the time t1, at a time t3, as a result of execution a store instruction using the load store unit of the core CORE_0, the data D1 in the cache L1$ is changed to data D2. Thereafter, at a time t4, similar to at the time t2, the data D2 is evicted from the cache L1$ into the cache L2$, and other data is stored in the cache L1$, whereby the data D2 is not stored in the cache L1$ (NA).

In the cache state described above, in both the case of the time t1 to the time t2 and the case of the time t1 to the time t3 or t4, in order for the core to search for latest data of which coherency is secured, it is needed to execute memory requests such that cache determination is performed in order from the level 1 cache L1$ of the core side of the cache to the level 2 cache L2$, the level 3 cache L3$, and the memory.

FIG. 5 illustrates a structure of a cache called a victim cache. The structure is similar to the structure illustrated in FIG. 4, and dashed dotted lines in the drawing represent a range of a cache in which data initially read from the memory is stored. In other words, a memory access controller does not store data read from the memory MEM in the level 3 cache L3$ and the level 2 cache L2$ but stores the data in the level 1 cache L1$ that is closest to the core. When a cache line of the data stored in the level 1 cache is evicted for storing another cache line, the evicted cache line is stored in the level 2 cache. In this way, in the victim cache, the content of the level 1 cache is not always stored in the level 2 cache, and the content of the level 2 cache is not always stored in the level 3 cache.

A table illustrated on the right side in the drawing represents an example of transitions of data stored in caches of three levels L1$ to L3$ for each time. Memory access from a time t1 to a time t2 and memory access from the time t1 to a time t3 or t4 are the same as those illustrated in FIG. 4. In the case of FIG. 5, at the time t2, data D1 stored in the cache L1$ is evicted into the cache L2$, and the data D1 is stored in the cache L2$. Similarly, at the time t3, data D2 overwritten into the cache L1$ is evicted into the cache L2$ at the time t4, and the data D2 is stored in the cache L2$.

Also in the cache state described above, in both the case of the time t1 to the time t2 and the case of the time t1 to the time t3 or t4, in order for the core to search for latest data of which coherency is secured, it is needed to execute memory requests such that cache determination is performed in order from the level 1 cache L1$ of the core side of the cache to the level 2 cache L2$, the level 3 cache L3$, and the memory.

As described above, in both the inclusion cache and the victim cache, a data search inside of caches is serially performed from the level 1 cache that is the highest ranking cache of the core side to the level 2 cache and the level 3 cache that are caches of lower ranks of the memory side.

Problem Due to Long Latency in Conventional Memory Request

Figure 6:
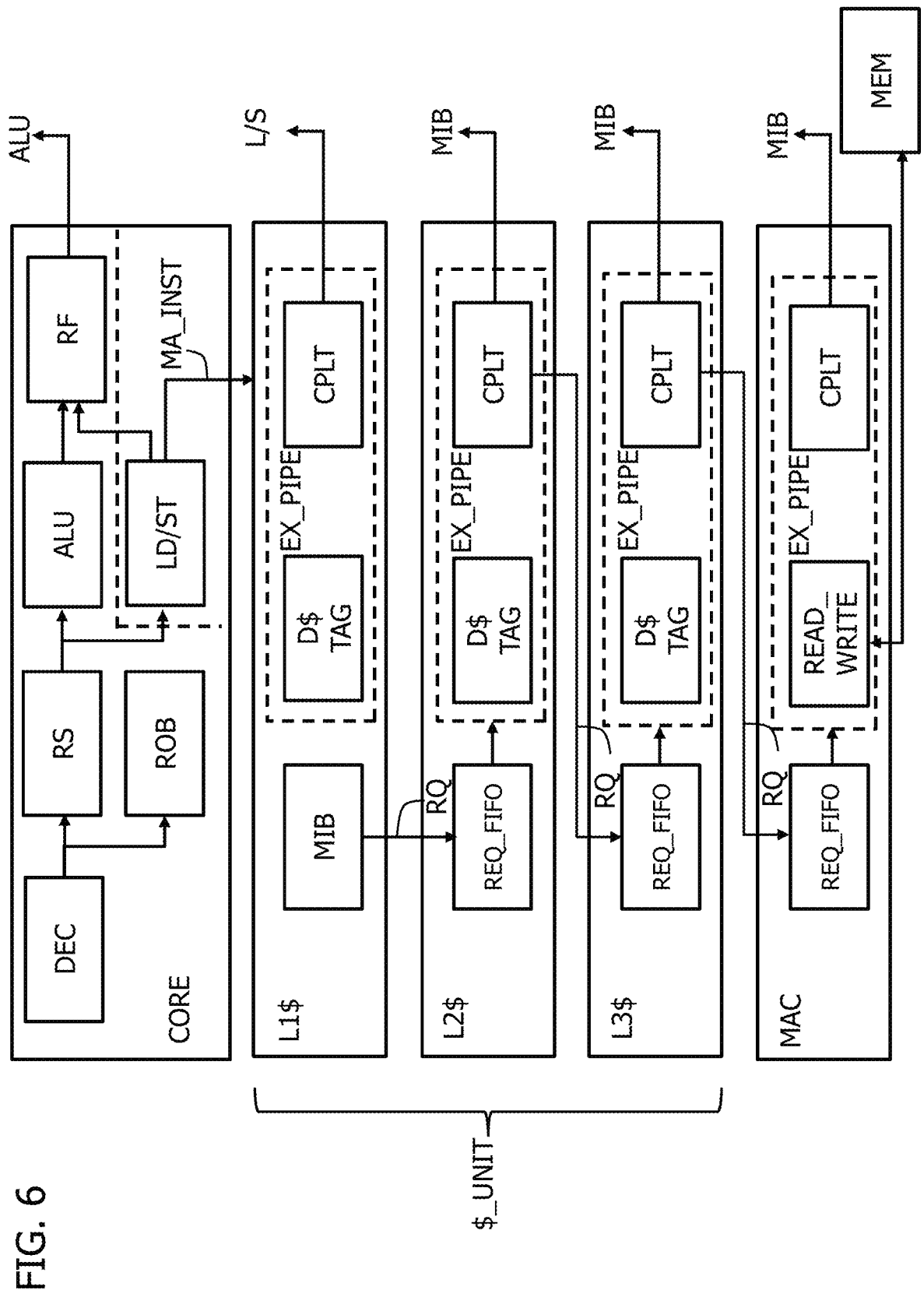
FIG. 6 is a diagram illustrating a configuration example of a conventional processor for describing an operation of a conventional memory request.

FIG. 6 is a diagram illustrating a configuration example of a conventional processor for describing an operation of a conventional memory request. In the drawing, as components of a processor, a core CORE, caches L1$, L2$, and L3$, and a memory access controller MAC are illustrated. In the core CORE, some of the components of the inside of the core illustrated in FIGS. 1 and 2 are illustrated. In other words, in the core CORE, an instruction decoder DEC, a reservation station RS, an arithmetic logic operation circuit ALU, a register file RF, a re-order buffer ROB, and a load store unit LD/ST are illustrated. Data and the like in the register file RF are input to the arithmetic logic operation circuit.

A cache unit $_UNIT of the processor illustrated in FIG. 6 has a level 1 cache L1$ to a level 3 cache L3$. The level 2 cache L2$ and the level 3 cache L3$ except the level 1 cache L1$ may be referred to as a cache unit $_UNIT. In addition, the cache unit may have a level 1 cache to a level N cache (here, N is an integer equal to or greater than 3).

The level 1 cache L1$ of the cache has a data cache D$, a tag TAG thereof, a pipeline circuit EX_PIPE that performs determination of a cache hit by checking the tag TAG of the data cache D$ for a memory access instruction MA_INST issued by the load store unit LD/ST, and a response circuit CPLT that gives a response of a processing result of the memory access instruction MA_INST to the load store unit. In addition, the level 1 cache L1$ has a move-in buffer MIB that issues a memory request RQ to the level 2 cache in the case of a cache miss and has a buffer storing data read in the memory request.

Each of the level 2 cache L2$ and the level 3 cache L3$ of the cache has a request FIFO (RQ_FIFO) that stores a memory request RQ issued by a higher-rank cache, a data cache D$ and a tag TAG thereof, a pipeline circuit EX_PIPE that performs determination of a cache hit for a memory request, and a response circuit CPLT that gives a response of a processing result of the memory request to the move-in buffer MIB. In the case of a cache miss, each of the response circuits CPLT of the level 2 cache and the level 3 cache issues a memory request RQ to a cache of a further lower rank or the memory access controller MAC.

The memory access controller MAC has a request FIFO that stores a memory request RQ issued by the level 3 cache L3$, a pipeline circuit EX_PIPE that controls memory access, a read and write circuit READ_WRITE that issues a read or write request for a memory request to the memory MEM, and a response circuit CPLT that gives a response of a processing result of a memory request to the MIB.

Next, an operation of the processor illustrated in FIG. 6 that is performed in a case where the load instruction of Row number 01 illustrated in FIG. 3 is executed will be described.

Figure 7:
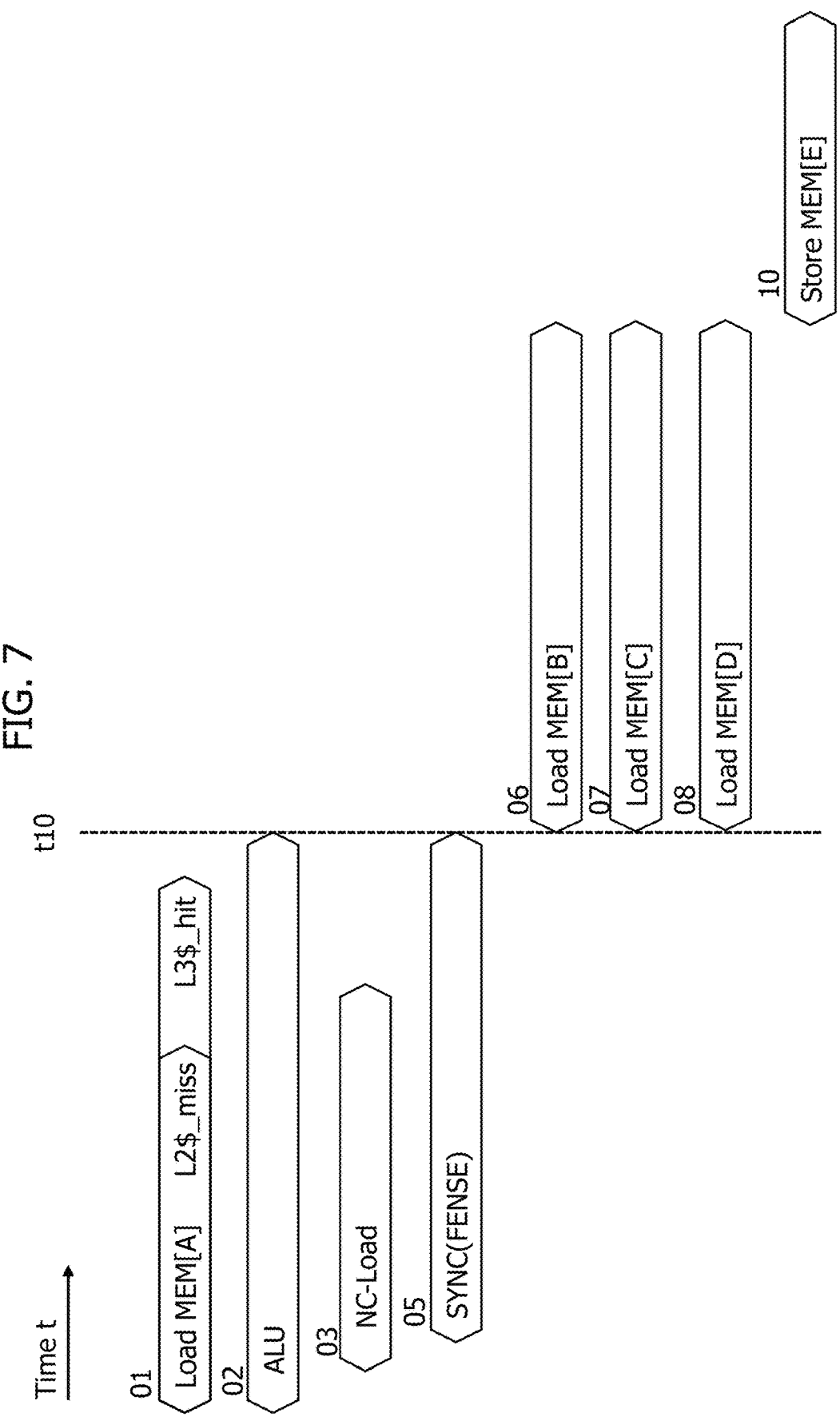
FIG. 7 is a diagram illustrating a timing diagram of operations of instruction strings illustrated in FIG. 3.

FIG. 7 is a diagram illustrating a timing diagram of operations of instruction strings illustrated in FIG. 3. In FIG. 7, row numbers of the instruction strings illustrated in FIG. 3 are illustrated. A horizontal direction is a time axis t. A load instruction Load MEM[A] of Row number 01 becomes a miss in the level 2 cache, and thereafter becomes a hit in the level 3 cache, and the execution is completed. An instruction of Row number 02, as described above, is an instruction depending on a result of the load instruction of Row number 01, and thus is completed after completion of this load instruction. A non-cache load instruction of Row number 03 does not depend on a result of Row number 01 and thus is completed before a completion time t10 of Row numbers 01 and 02. On the other hand, a barrier instruction of Row number 05 inhibits execution of instructions after that until completion of instructions before that. Thus, the barrier instruction, at a time t10 at which all the instructions before that are completed, starts execution of instructions after that, that is, load instructions of Row numbers 06 to 08. After the execution of such load instructions is completed, execution of a store instruction of Row number 10 is started.

Figure 8:
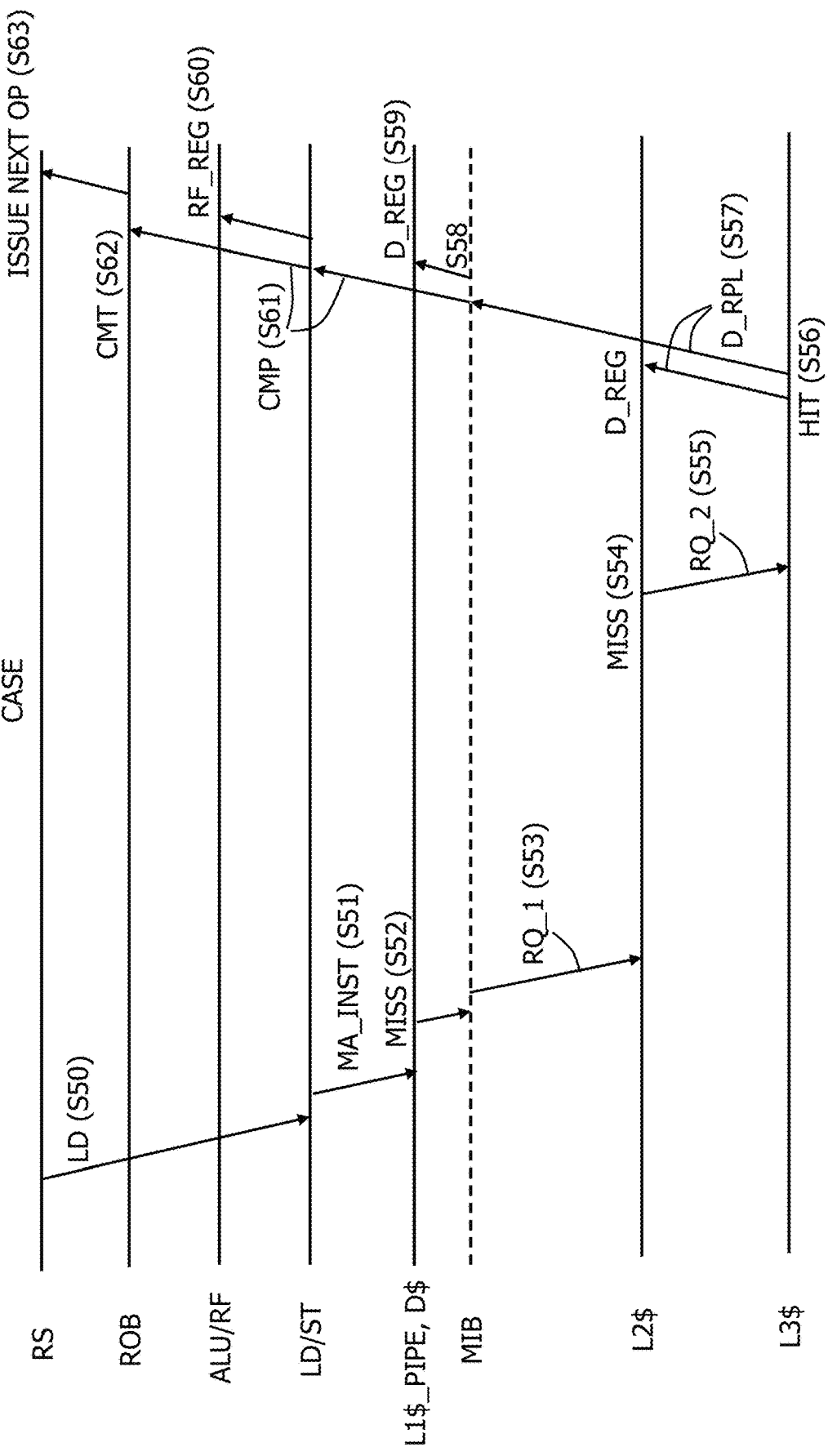
FIG. 8 is a diagram illustrating operations between circuits in a processor in the operation of the load instruction.

FIG. 8 is a diagram illustrating operations between circuits in a processor in the operation of the load instruction of Row number 01. Execution operations of the load instruction will be described with reference to FIGS. 6, 7, and 8.

As illustrated in FIG. 8, when address A of an operand of the load instruction Load MEM[A] is collected, the reservation station RS issues the load instruction to the load store unit LD/ST (S50). The load store unit issues a memory access instruction MA_INST to the level 1 cache L1$ (S51), and, in a response thereto, the pipeline circuit of the level 1 cache checks the tag of the data cache D$, and a cache miss occurs (S52). In response to the cache miss, the move-in buffer MIB secures an entry of the load instruction and issues a memory request RQ_1 to the level 2 cache L2$ (S53).

In response to the memory request RQ_1, the level 2 cache L2$ performs cache checking, and a cache miss occurs (S54). For this reason, the level 2 cache issues a memory request RQ_2 to the level 3 cache L3$ (S55). The level 3 cache performs cache checking, and a cache hit occurs (S56). So, the level 3 cache performs a coherency check process to confirm that the cache hit data is a latest data. Then the level 3 cache responds a data response D_RPL to the move-in buffer MIB (S57). The level 3 cache L3$ may transmit a data response D_RPL also to the level 2 cache L2$ (S57) to cause the level 2 cache L2$ to execute the move-in data registration D-REG registering data in the cache. The move-in buffer MIB stores data of the data response in an entry of the load instruction (S58) and performs data registration D_REG in which read data is stored in the data cache D$ inside of the level 1 cache (S59). In addition, the move-in buffer MIB notifies the load store unit LD/ST of the data response. In response to this notification, the load store unit LD/ST stores read data in a register in the register file RF (S60). In addition, the load store unit LD/ST notifies the re-order buffer ROB of completion CMP of the load instruction (S61) and, in response to the notification, the re-order buffer ROB performs commit processing CMT of the load instruction (S62). The completion of the commit processing CMT is notified to the reservation station RS, and the reservation station RS issues an instruction depending on the completed load instruction to the arithmetic unit (S63).

As illustrated in FIG. 7, executing a load instruction Load MEM[A] (Row number 01) by the load store unit and reading data of which coherency is secured by the caches are performed. Since the data read by the load instruction of Row number 01 is prepared, an instruction (Row number 02) depending on a result of the load instruction described above is executed by the arithmetic unit ALU. Furthermore, the non-cache load instruction NC_Load (Row number 03) and the barrier instruction Sync (FENCE) (Row number 05) are executed thereafter. The barrier instruction Sync (FENCE) permits execution of instructions when execution of the load instruction Load MEM[A] (Row number 01), the next instruction (Row number 02) and the NC load instruction (Row number 03) are completed at t10. Thus, the timing t10 of execution completion of the barrier instruction Sync is a timing when starting the execution of instructions after the barrier instruction. In addition, the execution completion of the barrier instruction Sync is after instructions before the barrier instruction, that is, the load instruction Load MEM [A] is completed, and the instructions depending on the result of the load instruction are completed. In order to advance the execution start timing t10 of the instructions after the barrier instruction, it is needed to advance completion of instructions (Row numbers 01 to 04) before the barrier instruction.

In the relation between the load instruction Load MEM [A] and the barrier instruction Sync (FENCE) illustrated in FIG. 3, in a case where latency of the process of reading data with coherency being secured in caches based on the load instruction Load MEM[A] is long, in accordance with the barrier instruction, start t10 of execution of instructions thereafter is delayed. Particularly, even in a case where the three load instructions (Row numbers 06, 07, and 08) illustrated in FIG. 3 are speculatively executable, such speculative execution waits until the time t10 in accordance with the barrier instruction. Such a situation lowers the program execution efficiency of the processor.

Processor of Example of the Present Embodiment

Figure 9:
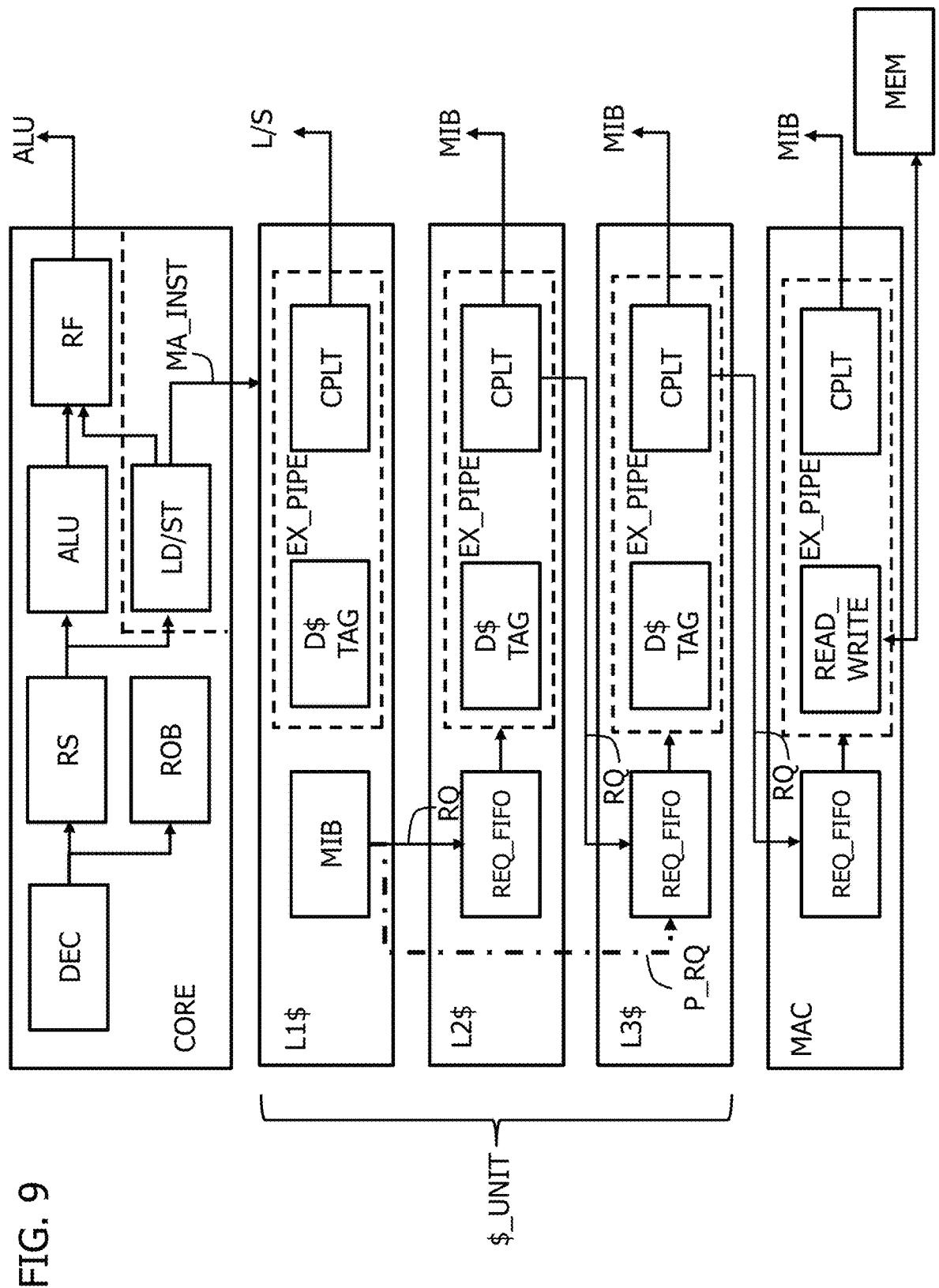
FIG. 9 is a diagram illustrating a configuration example of a processor according to this embodiment.

FIG. 9 is a diagram illustrating a configuration example of a processor according to the present embodiment. Circuits configuring the processor illustrated in FIG. 9 are the same as those illustrated in FIG. 6. However, in the processor illustrated in FIG. 9, first, when a cache miss occurs in a level 1 cache, when the move-in buffer MIB issues a memory request RQ to a level 2 cache that is a one-rank lower cache, the move-in buffer MIB issues a pseudo memory request P_RQ to a level 3 cache that is a cache of a further lower rank as well. P is an initial letter of pseudo. Instead of the move-in buffer MIB issuing a pseudo memory request P_RQ, the request FIFO of the level 2 cache L2$ may issue the pseudo memory request P_RQ to the level 3 cache in response to reception of a memory request RQ from the move-in buffer MIB. The point is that, in addition to issuance of sequential memory requests RQ from the move-in buffer MIB to a plurality of caches of lower ranks (the level 2 cache and the level 3 cache), pseudo memory requests are issued from the move-in buffer MIB to all the caches of lower ranks in parallel.

Second, in a conventional memory request that is sequentially issued to a plurality of caches of lower ranks (hereinafter, referred to as a normal memory request), a cache of each level gives a data response of latest data with coherency check been completed to the move-in buffer MIB. This will be referred to as a normal data response. On the other hand, in a pseudo memory request issued to a plurality of caches of lower ranks in parallel, a cache of each level gives a data response of pseudo data P_Data to the move-in buffer MIB without processing coherency checking of cache-hit data. This will be referred to as a pseudo data response. In this meaning, a pseudo state (P state) representing a coherency non-checked state is added to the cache line of the cache or the data state thereof.

Third, when a pseudo data response is received, the move-in buffer MIB notifies the re-order buffer ROB of pseudo completion of the load instruction. In response to this, the re-order buffer ROB notifies the reservation station and the like of pseudo completion of the load instruction. In response to the pseudo completion of the load instruction, the arithmetic unit executing the barrier instruction in FIG. 3 determines barrier release and sets speculative execution of instructions after the barrier instruction to be in a permitted state.

Fourth, the move-in buffer MIB compares the pseudo data P_Data received in the pseudo data response to the pseudo memory request with the coherency-secured normal data received in the normal data response to the normal memory request and determines whether or not the pseudo completion according to the pseudo memory request is successful. When the pseudo data coincides with the normal data, the pseudo completion according to the pseudo memory request is determined to be successful, and when the pseudo data does not coincide with the normal data, the pseudo completion is determined to be unsuccessful.

Fifth, when a notification indicating that the pseudo completion of the pseudo memory request has been unsuccessful is received, the re-order buffer ROB executes the process of rewinding the circuit state in the retriable area back to the circuit state before start of an instruction next to the load instruction. In addition, the load store unit LD/ST registers (moves in) the normal data received in the normal data response to the load instruction in the level 1 cache and overwrites the normal data into the register file of the arithmetic unit (move-in bypass). The retriable area is circuits except for the load store unit LD/ST in the core CORE illustrated in FIGS. 6 and 9.

Sixth, when a pseudo data response is received, the move-in buffer MIB does not perform the process of registering the pseudo data in the level 1 cache (the move-in process). Since the cache is a circuit outside of the retriable area, the pseudo data is not registered in the cache. On the other hand, the pseudo data is written into the register file in the retriable area (the move-in bypass process). This is different from data of a normal data response being registered in the cache (the move-in process) and being written into the register file in the arithmetic unit (the move-in bypass process).

FIG. 9 is a diagram illustrating a configuration example of the processor according to this embodiment. Similar to FIG. 6, in FIG. 9, as components of the processor, a core CORE, caches L1$, L2$, and L3$, and a memory access controller MAC are illustrated. In the core CORE, an instruction decoder DEC, a reservation station RS, an arithmetic logic operation circuit ALU, a register file RF, a re-order buffer ROB, and a load store unit LD/ST are illustrated. Data and the like in the register file RF are input to the arithmetic logic operation circuit.

The configurations of the level 1 to level 3 caches L1$, L2$, and L3$ and the memory access controller MAC are similar to those illustrated in FIG. 6. Here, the move-in buffer MIB in the level 1 cache L1$ issues a normal memory request RQ to the level 2 cache L2$ and issues a pseudo memory request P_RQ to the level 3 cache L3$. Alternatively, as described above, the request FIFO of the level 2 cache L2$ may be configured to issue a pseudo memory request to the level 3 cache in response to the normal memory request RQ issued by the move-in buffer MIB.

Move-In Buffer and Re-Order Buffer

Before the operation of a load instruction according to the processor according to this embodiment illustrated in FIG. 9 is described, a configuration example and an operation example of the move-in buffer MIB and the re-order buffer ROB will be described.

FIG. 13 is a diagram illustrating a buffer configuration example of the move-in buffer MIB. Here, a buffer configuration and a simple operation of the move-in buffer MIB according to this embodiment will be described. In FIG. 13, a buffer having four entries (rows) is illustrated. In each entry, information of a cache-missed memory access instruction, information of a normal memory request (an R memory request) issued to a cache, information of a pseudo memory request (a P memory request), information of a normal data response (an R data response), information of a pseudo data response (a P data response), and a success flag of the pseudo memory request are stored.

When a cache miss occurs in the level 1 cache L1$, the move-in buffer MIB secures an entry illustrated in FIG. 13 and stores corresponding memory access instruction information (for example, an instruction ID (IID), an instruction type (LD, ST, and the like), an address ADD, and the like). Then, the move-in buffer MIB stores normal memory request information R_RQ #(here, # is 1 to 4) (an ID, an address, and the like of the R memory request) and pseudo memory request information P_RQ #(here, # is 1 to 4) (an ID and an address of the P memory request, an issuance destination cache ID, and the like) and issues the R memory request and the P memory request to the level 2 cache and the level 3 cache respectively.

When a normal data response (an R data response) to the R memory request and a pseudo data response (a P data response) to the P memory request are received, the move-in buffer MIB stores information of each data response (a cache ID, normal data D, and pseudo data PD) and completion states R_CMP and P_CMP in entries corresponding thereto. Since each data response has an ID of the original memory request, the move-in buffer MIB can store the information described above in the entry corresponding to the received data response.

Figure 14:
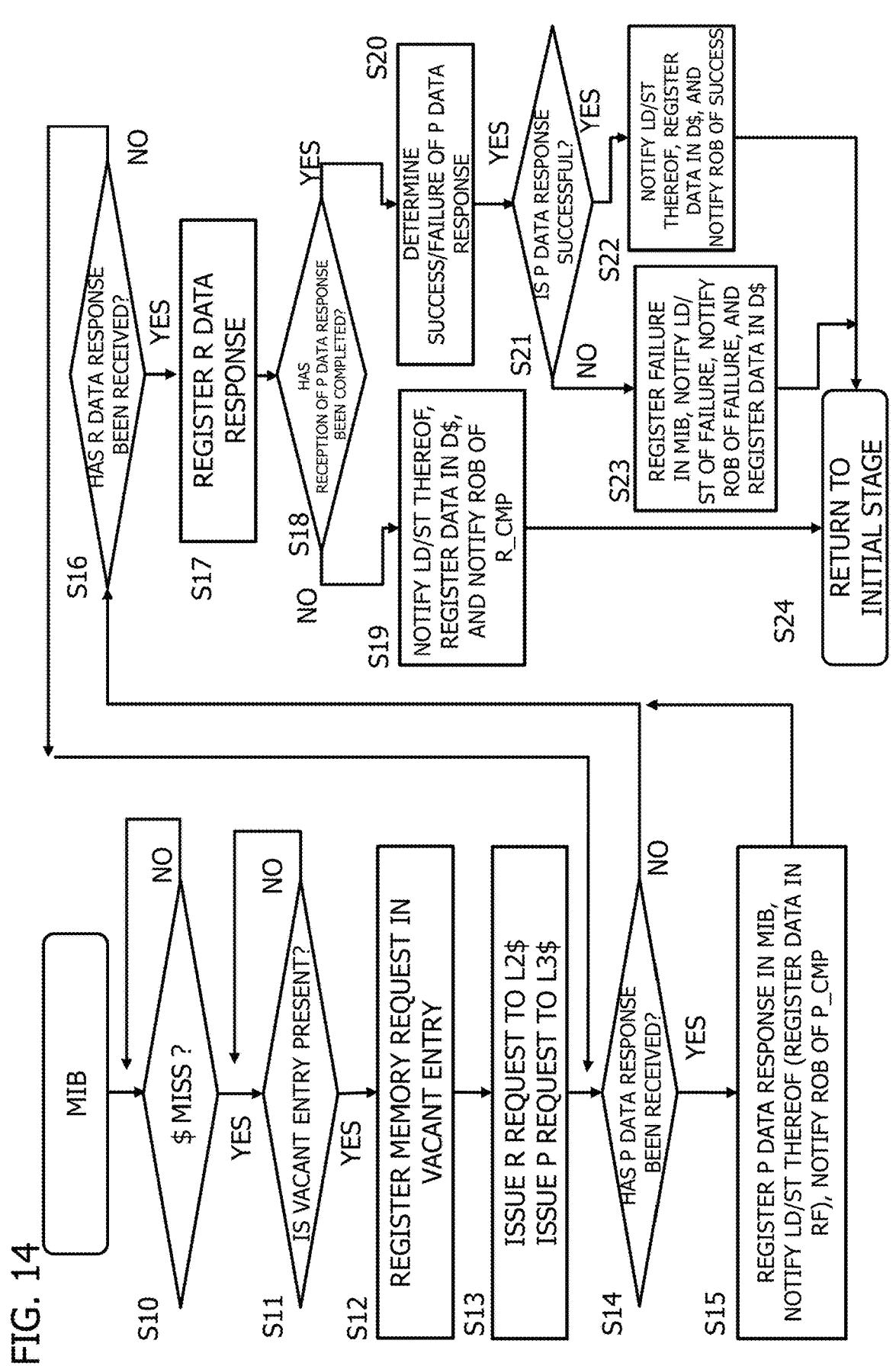
FIG. 14 is a diagram illustrating the flowchart of an operation example of the move-in buffer MIB.

FIG. 14 is a diagram illustrating the flowchart of an operation example of the move-in buffer MIB. When the level 1 cache checks a cache hit for the memory access instruction, and a cache miss occurs (Yes in S10), and when a vacant entry is present in the buffer (Yes in S11), the move-in buffer MIB registers the cache-missed memory access instruction information, the information of the normal memory request R-RQ #issued to the level 2 cache L2$, and the information of the pseudo memory request P_RQ #issued to the level 3 cache L3$ in the entry (S12). Then, the move-in buffer MIB issues the normal memory request R_RQ to the level 2 cache L2$ and issues the pseudo memory request P_RQ to the level 3 cache L3$ (S13). As described above, the pseudo memory request may be issued from the request FIFO of the level 2 cache.

When the pseudo data response P_D_RPL is received (Yes in S14), the move-in buffer MIB registers information of the pseudo data response P_D_RPL (a cache ID (for example L3) of a response source, pseudo data PD, and a pseudo response completion flag P_CMP) in the corresponding entry of the buffer illustrated in FIG. 13, notifies the load store unit LD/ST of the pseudo data response, registers the pseudo data PD in the register file RF, and notifies the re-order buffer ROB of pseudo completion P_CMP (S15). The load store unit LD/ST may notify the re-order buffer ROB of the pseudo completion P_CMP.

When the normal data response R_D_RPL is received (S16), the move-in buffer MIB registers information of the normal data response R_D_RPL (a cache ID of a response source, data D, and a normal completion flag R_CMP) in the corresponding entry of the buffer (S17). In this case, when the pseudo data response P_D_RPL has already been received (Yes in S18), the move-in buffer MIB compares the pseudo data PD stored in the buffer with the data D of the normal data response to perform success/failure determination representing whether the pseudo data response was successful or unsuccessful (S20). When the pseudo data PD of the pseudo data response coincides with the data D of the normal data response, the move-in buffer MIB determines that the pseudo data response according to the pseudo memory request P_RQ is successful. When the pseudo data PD does not coincide with the data D, the move-in buffer MIB determines that the pseudo data response is unsuccessful.

In the successful case (Yes in S21), the MIB notifies the load store unit LD/ST that the pseudo memory request has been successful, registers the pseudo data of the pseudo data response (or the data D of the normal data response) in the data cache D$, and notifies the re-order buffer ROB of the success of the pseudo data response (S22).

In the unsuccessful case (No in S21), the MIB registers a failure as the pseudo memory request success flag in the corresponding entry of the buffer, notifies the load store unit LD/ST that the pseudo memory request has been unsuccessful, and notifies the re-order buffer ROB of a failure of the pseudo data response (S23). The notification of a success or a failure of the pseudo data response may be performed by the load store unit LD/ST for the re-order buffer ROB. In addition, in the unsuccessful case, the MIB registers the data D of the normal data response that has already been received in the level 1 cache (a move-in process) (S23), and the load store unit LD/ST overwrites and registers the data D in the register file RF of the arithmetic unit (a move-in bypass process).

On the other hand, when the pseudo data response has not been received before reception of the normal data response (No in S18), the move-in buffer MIB notifies the load store unit LD/ST of the R data response, registers the response data D in the data cache D$, and notifies the re-order buffer ROB of normal completion R_CMP (S19). The above-described notification for the re-order buffer may be performed by the load store unit in place of the MIB. In addition, the response data D is registered also in the register file RF of the arithmetic unit in the core.

Re-Order Buffer

FIG. 15 is a diagram illustrating a buffer configuration example of the re-order buffer ROB according to this embodiment. When the instruction decoder decodes an fetched instruction, and the decoded instruction is issued to the reservation station RS of the arithmetic unit, the instruction is notified also to the re-order buffer ROB. In response to this notification, the re-order buffer ROB stores information of the instruction (instruction information) issued by the decoder described above in each entry of the buffer. The instruction information is as illustrated in the first column from the left side in the drawing. The instruction information, for example, is an instruction ID (IID) of a program and an instruction INST thereof.

Furthermore, the re-order buffer records, in each entry of the buffer, instruction re-execution information REXC_INF for rewinding the retriable area back to the state before the speculative execution of the instruction and for re-executing the instruction when speculative execution of the instruction has been unsuccessful. The instruction re-execution information REXC_INF is illustrated in the second column from the left side in the drawing. More specifically, the instruction re-execution information includes state information before instruction speculative execution of a register and a circuit in the retriable area, information of a flag, parameters, a storage place of the data and the like of the instruction being executed speculatively. In addition, a normal completion flag (R completion flag) R_CMP representing whether or not completion of the instruction has been notified from the arithmetic unit (illustrated in the third column from the left side in the drawing), success/failure information (a success or a failure) representing whether or not speculative execution of the instruction has been successful, and information REXC representing whether or not the instruction is being re-executed after rolling back the circuits of the retriable area in the case of a failure (illustrated in the sixth column from the left side in the drawing), and the like are recorded in each entry of the buffer.

The re-order buffer ROB executes commit processing (completion processing) starting from an instruction of which issuance by the decoder is the oldest among instructions of entries in which the normal completion flag R_CMP representing completion notification of the instruction received from each arithmetic unit is recorded. In other words, when all the instructions whose program orders are before the instruction with the normal completion flag being recorded have being commit-processed, the re-order buffer ROB performs commit processing of the instruction with the normal completion flag being recorded. The commit processing includes releasing circuit resources that are used in execution of the instruction, an increment of the program counter, and the like. In other words, the re-order buffer ROB performs, in order that is the instruction order of the program, commit processing of an instruction string, which is executed in execution preparation complete order at the reservation station of each arithmetic unit, that is, not in an instruction order of the program but in out-of-order of the program.

In this embodiment, the re-order buffer records the pseudo completion flag P_CMP notified at the time of reception of a pseudo data response to a pseudo memory request from the move-in buffer MIB or the load store unit LD/ST in each entry of the buffer. The pseudo completion flag P_CMP is in the fourth column from the left side in the drawing. In addition, in response to reception of the pseudo completion flag (the P completion flag) P_CMP, the re-order buffer records, in the entry, a pseudo commit flag (a P commit flag) P_CMT representing whether or not pseudo commit processing for speculative execution of a corresponding instruction has been performed. The pseudo commit flag P_CMP is in the fifth column from the left side in the drawing. In addition, in each entry illustrated in FIG. 15, INV represents that the data or the flag is invalid data or an invalid flag.

Figure 16:
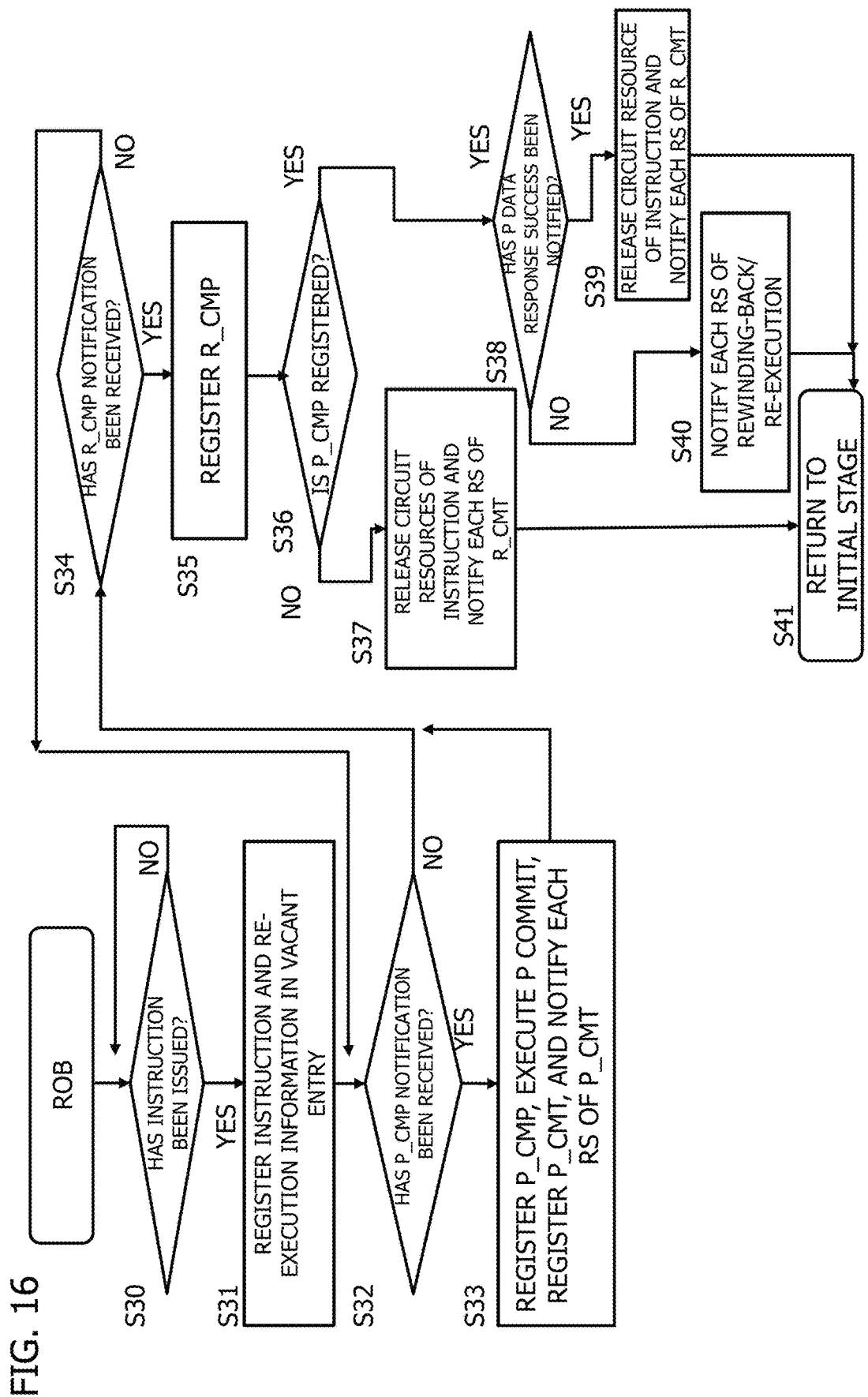
FIG. 16 is a diagram illustrating the flowchart of an operation example of the re-order buffer ROB.

FIG. 16 is a diagram illustrating the flowchart of an operation example of the re-order buffer ROB. When the decoder issues an instruction (Yes in S30), the re-order buffer ROB registers instruction information and re-execution information of the issued instruction in a vacant entry of the buffer (S31). When a pseudo completion notification P_CMP is received from the move-in buffer MIB or the load store unit LD/ST (Yes in S32), the re-order buffer ROB registers the pseudo completion flag P_CMP in the entry, executes a pseudo commit (P commit) of the instruction that has been completed in a pseudo manner, registers the pseudo commit flag P_CMT, and notifies each reservation station RS of the pseudo commit P_CMT (S33). The pseudo commit is a process in which, pseudo data is stored in the register file RF in the retriable area, but registration of the pseudo data is not performed to the cache in a retry-unable area. And the pseudo commit is for changing or releasing minimal circuit resources and the like that enables an instruction following the instruction, which has been committed in a pseudo manner, to be speculatively executed.

Furthermore, when a normal completion notification R_CMP is received from the move-in buffer MIB or the load store unit LD/ST (Yes in S34), the re-order buffer ROB registers the normal completion flag R_CMP in the entry (S35), checks the pseudo completion flag of the entry of the instruction, and checks whether or not the pseudo completion flag P_CMP is registered (S36).

In a case where the pseudo completion flag P_CMP is registered (Yes in S36), when the execution of the pseudo memory request to which a response of pseudo data has been given from the move-in buffer MIB or the like is notified to be successful (Yes in S38), the re-order buffer performs normal commit processing such as releasing circuit resources of the instruction to which the pseudo data response has been given and the like, and notifies each reservation station RS of the normal commit R_CMT (S39).

On the other hand, when a failure is notified (No in S38), the re-order buffer ROB executes rewinding of a retriable area back to the state before the speculative execution of the instruction after the load instruction and notifies each reservation station RS of the state of the retriable area having been rewound and re-execution of the instruction that has been speculatively executed after the failed load instruction (S40). Since an instruction after the failed load instruction has been speculatively executed based on the load data of the failed load instruction, the reservation station RS rewinds the state of the retriable area back to the state before speculative execution of the instruction that has been speculatively executed in response to this notification of the failure. In addition, as described above, the normal data is registered (moved in) in the level 1 cache L1$, and the normal data is overwritten (moved-in bypass) in the register file RF of the arithmetic unit.

In addition, in a case where the pseudo completion flag P_CMP is not registered (No in S36), the re-order buffer performs normal commit processing such as releasing circuit resources of the instruction that has been notified to be normally completed and notifies each reservation station RS of the normal commit R_CMT (S37). Then, the operation returns to the beginning of the flowchart (S41).

Operation Example (1) of Processor Executing Load Instruction

Next, in the processor illustrated in FIG. 9, operations performed when the load instruction of Row number 01 illustrated in FIG. 3 is executed will be described.

Figure 10:
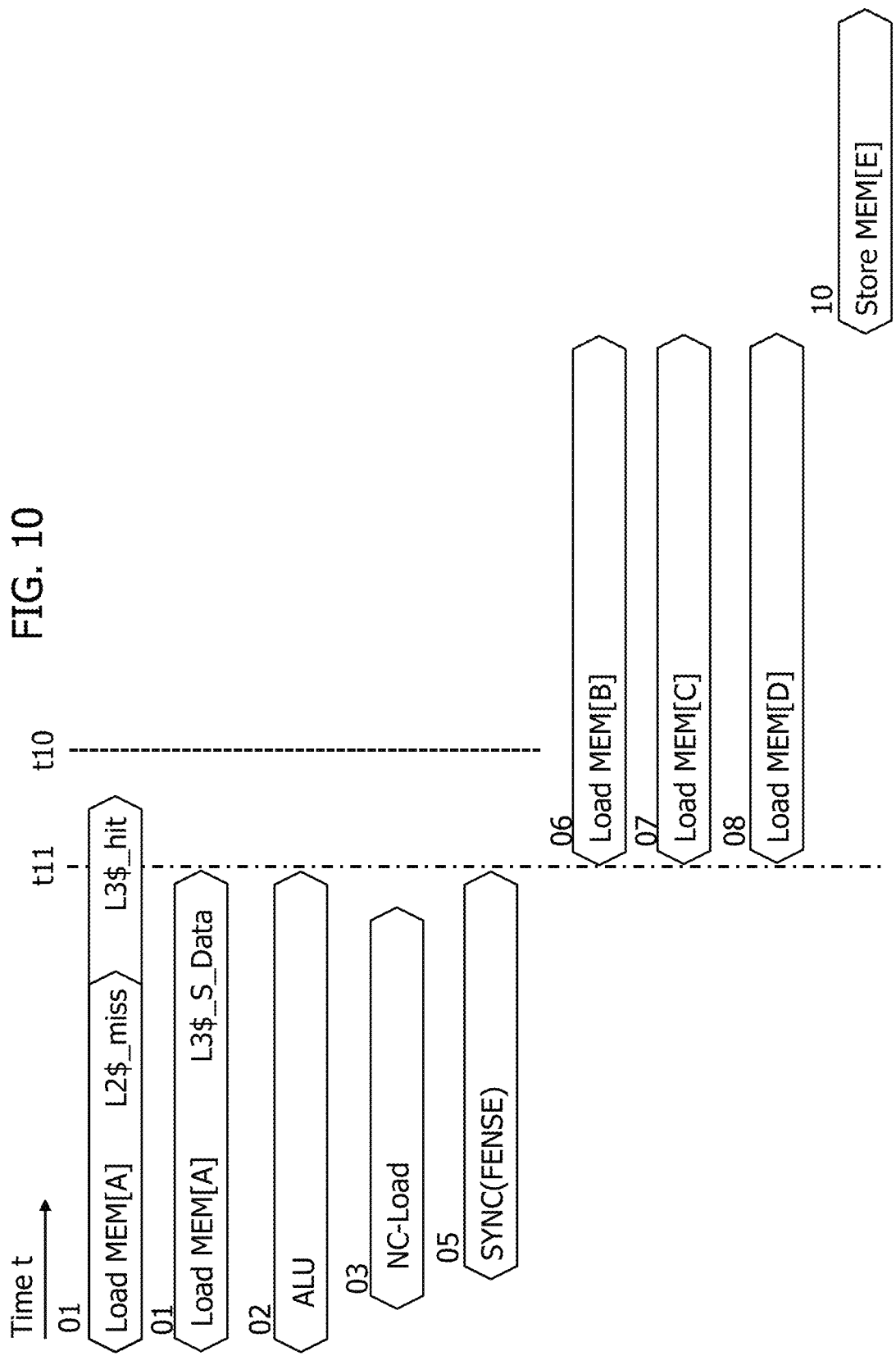
FIG. 10 is a diagram illustrating a timing diagram of an operation of a load instruction.
Figure 11:
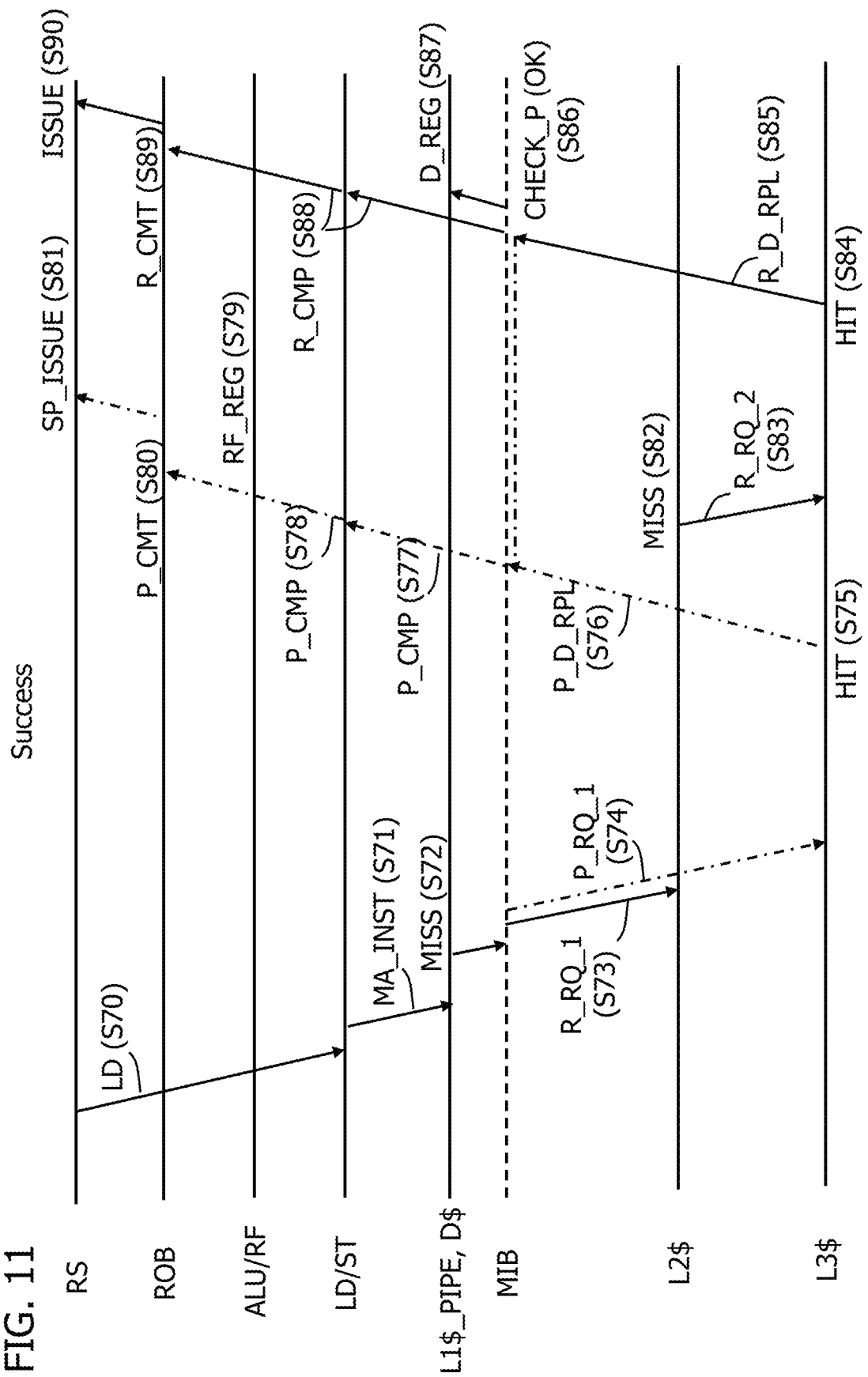
FIG. 11 is a diagram illustrating operations between circuits in a processor in the operation of the load instruction
Figure 12:
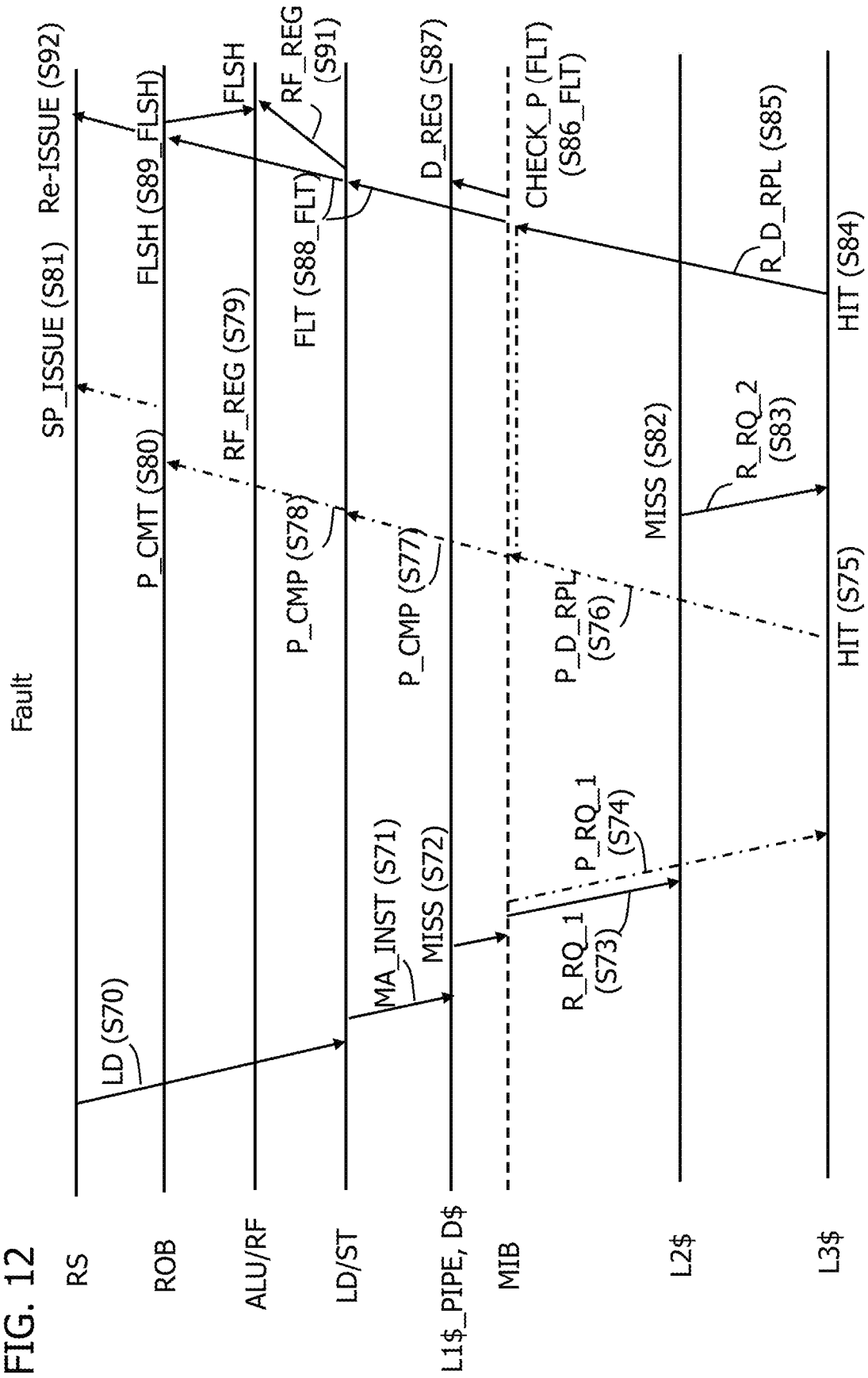
FIG. 12 is a diagram illustrating operations between circuits in a processor in the operation of the load instruction

FIG. 10 is a diagram illustrating a timing diagram of an operation of a load instruction. FIGS. 11 and 12 are diagrams illustrating operations between circuits in the processor in the operation of the load instruction. The operation (1) of the load instruction will be described with reference to FIGS. 9, 10, and 11.

The operation (1) of the load instruction is an operation of a case where the move-in buffer MIB compares data of a P data response with data of an R data response to determine (S86_FLT) whether the pseudo completion of the P memory request is successful or unsuccessful, and as a result of the determination, both pieces of the data coincide with each other and the pseudo completion of the P memory request has been successful.

When address A of the operand of the load instruction Load MEM[A] is prepared, the reservation station RS issues the load instruction to the load store unit LD/ST (S70). The load store unit LD/ST executes the load instruction and issues a memory access instruction MA_INST to the level 1 cache L1$ (S71). In response thereto, the pipeline circuit EX_PIPE of the level 1 cache L1$ checks the tag of the data cache D$, and it is assumed that a cache miss has occurred (S72). In response to the cache miss, the move-in buffer MIB secures an entry of a memory access instruction in the buffer and issues a normal memory request R_RQ_1 to the level 2 cache L2$ (S73). Here, the normal memory request is a name for distinguishing from a pseudo memory request to be described below and is a conventional memory request. Thus, the normal memory request is caused to serially propagate from the level 1 cache to the level 2 cache and further to a last level cache, latest data of which coherency is secured is acquired from the cache or the memory, and a response of data acquired therefrom is given to the move-in buffer.

At this time, the move-in buffer MIB, which has issued the normal memory request, issues the pseudo memory request P_RQ_1 to, preferably, all the caches on the last level cache side of the level 2 cache, that is, the level 3 cache L3$ (S74). This pseudo memory request (the P memory request) P_RQ_1 may be issued to the level 3 cache L3$ by the request FIFO in the level 2 cache in response to reception of the normal memory request R_RQ_1. In this embodiment, although the last level cache is the level 3 cache, in a case in which the last level cache is a level 4 cache, the pseudo memory request is issued to the level 3 cache and the level 4 cache in parallel. As a result, the move-in buffer MIB issues the pseudo memory request P_RQ # to all the caches of the level 3 or less in parallel.

It is assumed that the level 3 cache L3$ performs cache checking in response to the P memory request P_RQ_1, and a cache hit has occurred in a cache line with the state S (share) (S75). At this time, the level 3 cache L3$ does not perform coherency checking of the cache-hit data (the cache line) of which the state is S and gives a reply of the P data response P_D_RPL to the move-in buffer MIB (S76).

Generally, when the processor A has had a cache hit in the cache line of which the state is S, a state in which a cache line of the same address may be present also in a cache of another processor B is formed. This is different from a case where a cache hit has occurred in a cache line with the state E. When a cache hit has occurred in the state S, there is a possibility that the processor B writes data into the cache line, and the state becomes M. Thus, the processor A sends to other processors including the processor B a request to, when the same cache line with the state M is included in the cache, write the cache line into the memory and set the state to I (invalid). Then, when an invalidation completion notification is received from the processor B, the processor A reads the latest data from the memory, registers the latest data in the cache with the state E and gives a response of data to the move-in buffer MIB.

The process of the processor for acquiring latest data from the cache as described above will be referred to as a procedure of securement of coherency in this specification. The procedure of securement of coherency includes coherency checking (or a snooping process) that is a process of inquiring cache states of other processors.

In this embodiment, when a hit has occurred in data (the cache line) of the state S (S75), the cache unit of the level 3 cache L3$ does not perform the coherency checking described above and transmits a pseudo data response P_D_RPL to the move-in buffer MIB using the hit data (S76). In accordance with this, latency of the pseudo memory request can be shortened. However, since the coherency checking has not been performed, there is no assurance that the hit data is latest data of which coherency is secured. The latest data may be stored in the level 2 cache with the state M or may be stored in a cache of another processor with the state M.

In response to this P data response, the move-in buffer MIB stores information of the P data response in the entry in the buffer and notifies the load store unit LD/ST and the re-order buffer ROB of the pseudo completion P_CMP (S77, S78) without registering the response data in the data cache D$ of the level 1 cache (in other words, without performing a move-in process). The load store unit stores data of the pseudo data response in the register in the register file RF (in other words, performs the move-in bypass process) (S79). The register file RF is provided in a retriable area and thus can store the data of the P data response. If the P memory access has failed, the data of the P data response is not correct data. For this reason, although the data of the P data response may be registered in a retriable area that can be rewound, the data of the P data response is not registered in a cache that cannot be rewound.

In addition, in response to the pseudo completion P_CMP, the re-order buffer ROB performs the process of the pseudo completion P_CMT for a load instruction (S80). In response to this, the barrier state of the barrier instruction Sync (FENSE) is released, and the reservation station RS issues instructions after the barrier instruction, that is, three load instructions toward Addresses B, C, and D in the example illustrated in FIG. 3 to the arithmetic unit for speculative execution SP_ISSUE (S81).

Thereafter, the level 2 cache L2$ performs cache checking in response to the R memory request R_RQ_1, and a cache miss occurs (S82). For this reason, the level 2 cache issues an R memory request R_RQ_2 to the level 3 cache L3$ (S83). The level 3 cache L3$ performs cache checking in response to the R memory request R_RQ_2. In a case in which the level 3 cache has a cache hit in the state S in this cache checking, a cache hit occurs in the coherency checked data via the procedure of securing coherency (S84), and the level 3 cache gives a reply of the R data response R_D_RPL to the move-in buffer MIB (S85).

As described above, when the level 3 cache has a cache hit in the state S, the level 3 cache performs a snooping process for caches of other processors and, when another processor owns the same cache line with the state M, causes the memory to perform overwriting. Thereafter, the processor reads the latest data from the memory and gives a response of data to the move-in buffer MIB. This is the procedure of securing coherency and represents that a cache hit occurs in the coherency-checked data described above.

The move-in buffer MIB stores data of the R data response in the entry of the load instruction, compares the data of the P data response with the data of the R data response, and determines whether the pseudo completion of the P memory request has been successful or unsuccessful (S86). In case of coincident, the pseudo completion of the P memory request becomes successful, and the load store unit LD/ST performs data registration (in other words, move-in) D_REG in the level 1 cache L1$ (S87). In the data registration, the load store unit stores the data of the P data response or the data of the R data response, which coincide with each other in the comparison operation described above, in the data cache D$ in the level 1 cache (S87). Then, the move-in buffer MIB or the load store unit LD/ST notifies the re-order buffer ROB of normal completion R_CMP of the load instruction (S88). In response to the notification of this normal completion R_CMP, the re-order buffer ROB performs normal commit processing R_CMT of the load instruction and an instruction after the load instruction which has been speculatively executed (S89). The completion of the normal commit processing R_CMT is notified to the reservation station RS, and the reservation station RS issues an instruction depending on the completed instruction that has been speculatively executed to the arithmetic unit (S90).

The operation example illustrated in FIGS. 10 and 11 is an example in which the P data response from the level 3 cache L3$ according to the P memory request is successful, in other words, the P data of the P data response was the coherency-secured latest data. As illustrated in FIGS. 10 and 11, in response to the P data response, the re-order buffer ROB performs pseudo commit (pseudo completion) P_CMT of the load instruction, and the barrier instruction can release the barrier state, and speculative execution of an instruction after the barrier instruction can be started. In other words, as illustrated in FIG. 10, a time t11 of the pseudo completion of the barrier instruction is earlier than the completion time t10 illustrated in FIG. 7. Thus, even in a case in which latency until completion of the memory request becomes long due to the coherency checking process, a speculative execution of a subsequent instruction can be started in response to the pseudo data response of the pseudo memory request. In accordance with this, the processing efficiency of the processor can be improved.

Operation Example (2) of Processor Executing Load Instruction

Next, an operation example of a case where the processor illustrated in FIG. 9 executes a load instruction of Row number 01 illustrated in FIG. 3, that is, the operation (2) of the load instruction will be described with reference to FIGS. 9, 10, and 12.

The operation (2) of the load instruction is an operation of a case where the move-in buffer MIB compares data of a P data response with data of an R data response and determines (S86_FLT) whether the pseudo completion of the P memory request is successful or unsuccessful, and as a result of the determination, both pieces of the data do not coincide with each other, and the pseudo completion of the P memory request has been unsuccessful.

As illustrated in FIG. 12, the move-in buffer MIB determines that the pseudo completion of the P memory request is unsuccessful (S86_FLT), registers a failure in the memory request success flag of the entry, registers (in other words, moves in) D REG the data of the R data response in the level 1 cache (S87), and furthermore notifies the load store unit LD/ST of the failure FLT of the P memory request (S88_FLT). Then, when the load store unit notifies the re-order buffer ROB of the failure FLT (S88_FLT), the re-order buffer ROB registers "failure" in the success/failure flag of the entry, and rewinds (flushes) the state of the retriable area of the arithmetic unit ALU back to the state before speculative execution of an instruction after the load instruction (S89_FLSH).

In accordance with this rewinding back, the state of the retriable area according to the speculative execution of a barrier instruction that is an instruction after the load instruction and the speculative execution of three load instructions after the barrier instruction is rewound to the state before the speculative execution. Together with the rewinding back FLSH, preferably, after the rewinding back FLSH, the load store unit LD/ST registers (in other words, move-in bypass) RF_REG correct or latest R data in the register of the register file RF of the arithmetic unit ALU. As a result, correct R data of the failed load instruction is registered (moved-in) D_REG (S87) in the level 1 cache L1$ and is registered (moved-in bypass) RF_REG (S91) in the register file RF of the arithmetic unit ALU, and the execution of the load instruction is completed. The re-order buffer ROB requests the reservation station RS to reissue an instruction of which speculative execution has failed to the arithmetic unit (S92). Operations other than those described above are the same as the operations (1) of the load instruction.

State of Data Having Cache Hit in Pseudo Memory Request

In the operation (1) of the load instruction illustrated in FIG. 11, the pseudo memory request has a cache hit in the cache line (or data) with the state S in the level 3 cache, and the level 3 cache gives a pseudo data response of the data with the state S to the move-in buffer MIB, and thereafter, the data of the pseudo data response coincides with latest data of the coherency-secured data.

In an MESI protocol, as states of the cache line (the state of data) of the cache, there are a state I, a state E, and a state M in addition to the state S. First, in a case where a pseudo memory request has a cache hit in the cache line with the state E in the level 3 cache, in the MESI protocol, since the cache line with the state E maintains only one cache, data of the hit cache line is coherency-secured latest data. In the first case, in a case where a pseudo memory request has a cache hit in the level 3 cache and gives a response of pseudo data to the move-in buffer, the response is quicker than in a case where, after a normal memory request has a cache miss in the level 2 cache, the level 3 cache has a cache hit and gives a response of normal data to the move-in buffer.

Second, in a case where a pseudo memory request has a cache hit in the cache line with the state M in the level 3 cache, in the MESI protocol, since the cache line with the state M maintains only one cache, data of the hit cache line is coherency-secured latest data. For this reason, similar to the case of the first state E described above, pseudo data according to a pseudo memory request is quicker than a normal data response according to a normal memory request.

Third, in a case where a pseudo memory request does not detect a cache line of the same address in the level 3 cache, a cache miss occurs in the level 3 cache. In this embodiment, as a first method, the level 3 cache does not notify the move-in buffer of a pseudo data response and does not execute memory access. In the first method, in a normal data response according to the normal memory request, the move-in buffer acquires coherency-secured latest data. As a second method, the level 3 cache executes memory access, acquires coherency-checked data from the memory, and gives a response of the data acquired from the memory to the move-in buffer as a normal data response. In accordance with this, there may be a case where the move-in buffer can receive the normal data response more quickly than a normal data response of data acquired from the memory according to the normal memory request.

Operation Example of Case in Which Move-in Buffer Receives Plurality of Pseudo Data Responses In this embodiment, in a case where a plurality of caches of the level 3 or less are disposed, the move-in buffer MIB issues a pseudo memory request to the plurality of caches of the level 3 or less in parallel. For this reason, the move-in buffer may receive a plurality of pseudo data responses respectively corresponding to the plurality of pseudo memory requests. In this embodiment, for a plurality of pieces of received pseudo data, the move-in buffer MIB registers the pseudo data in the move-in buffer with a predetermined priority level.

As one example of the predetermined priority level, a first pseudo data response from a first cache close to the processor core has a higher priority level than a second pseudo data response from a second cache that is far from the processor core. Furthermore, regardless of the priority level described above, a priority level of the pseudo data response of the data of the state M is the highest. Based on such priority levels, the move-in buffer determines whether or not the pseudo data of a received pseudo data response is overwritten in the move-in buffer. The overwriting means that, into pseudo data having a low priority level, pseudo data having a higher priority level than the low priority level described above is overwritten.

In accordance with this, when a normal data response is received, the move-in buffer stores pseudo data of a pseudo data response having the highest priority level among a plurality of pseudo data responses received before reception of a normal data response. Then, the move-in buffer compares the pseudo data stored in the move-in buffer with normal data of the normal data response and determines a success or a failure of the pseudo memory request. In comparison with the pseudo data having the highest priority level, the probability of the pseudo memory request being determined to be successful becomes high.

Another Example of Instruction String in Which Process for Securing Coherency in Cache Inhibits Speculative Execution FIG. 17 is a diagram illustrating an example of an instruction string different from that illustrated in FIG. 3. In the example illustrated in FIG. 17, an instruction ldr is a load instruction and an instruction add is an add instruction. An instruction ldr of Row number 01 is an instruction for loading data of Address x9 into a register x0. An instruction add of Row number 02 is an instruction for adding 8 to the data of the register x0 and storing a result in a register X1. An instruction ldr of Row number 03 is an instruction for loading data of Address x1 into a register x2.

In the case of a simple instruction string as described above, the instruction add of Row number 02 is unable to start to be executed unless the load instruction ldr of Row number 01 is not completed, and thus the instruction add of Row number 02 has a relation depending on a result of the instruction ldr of Row number 01. The instruction ldr of Row number 03 is unable to start to be executed unless the add instruction add of Row number 02 is not completed, and thus the instruction ldr of Row number 03 has a relation depending on a result of the instruction add of Row number 02. In a plurality of instruction having such a dependent relation, by shortening latency of the previous load instruction in a pseudo manner using a pseudo memory request, speculative execution of a subsequent instruction having a dependent relation with this load instruction can be advanced. Thus, also in the instruction string as illustrated in FIG. 17, the processor according to this embodiment is effective.

As described above, in this embodiment, for a memory access instruction from a load store, the move-in buffer in the level 1 cache issues a pseudo memory request to a plurality of caches of lower levels in parallel separately from a normal memory request sequentially propagating through a plurality of caches of lower levels. Then, when data acquired by the pseudo memory request is received in a pseudo data response, the move-in buffer notifies the re-order buffer of pseudo completion to cause the re-order buffer to speculatively commit the memory access instruction. In accordance with this, speculative execution of a subsequent memory can be advanced.

According to a first aspect, a processor capable of shortening latency of memory access is provided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor comprising:
a plurality of core circuits each having an arithmetic operation circuit executing an issued instruction, a load store unit that executes an issued memory access instruction, a level 1 cache, and a re-order buffer that controls an instruction execution completion process of the arithmetic operation circuit and the load store unit; and
a cache unit having a plurality of caches from a level 2 cache to a level N cache, N being an integer equal to or greater than 3,
wherein the level 1 cache has a move-in buffer that has a plurality of entries in which a memory access instruction that results in a cache miss in the level 1 cache is stored,
wherein the move-in buffer
issues a normal memory request, which performs memory access of the memory access instruction that results in the cache miss, to the level 2 cache, the normal memory request being issued from the level 2 cache to the level N cache serially, and
receives a normal data response that has coherency-secured data from any one of the level 2 cache to the level N cache in which the normal memory request result in a cache hit,
wherein, when the normal memory request is issued to the level 2 cache,
a pseudo memory request that performs the memory access is issued to a level 3 cache in a case where N is 3, or
the pseudo memory request is issued to the level 3 cache to the level N cache in parallel in a case where N is 4 or more,
wherein the move-in buffer receives a pseudo data response that has coherency-unsecured data from any one cache in which the pseudo memory request result in a cache hit, and
wherein the re-order buffer
executes a normal instruction execution completion process in response to the normal data response,
executes a pseudo instruction execution completion process in response to the pseudo data response, and,
when the pseudo data response is a failure, rewinds the arithmetic operation circuit, which speculatively executed an instruction after the memory access instruction that result in the cache miss in response to the pseudo instruction execution completion process, back to a state before the speculative execution.

2. The processor according to claim 1, wherein
the level 1 cache
stores data of the normal data response in a cache memory in the level 1 cache in response to the normal data response and
does not store data of the pseudo data response in the cache memory in the level 1 cache in response to the pseudo data response.

3. The processor according to claim 2, wherein
the data of the normal data response is stored in a register in the core circuit in response to the normal data response,
the data of the pseudo data response is stored in the register in the core circuit in response to the pseudo data response, and
when the pseudo data response is a failure, the data of the normal data response is overwritten into the register in the core circuit.

4. The processor according to claim 1, wherein,
when the normal data response is received after reception of the pseudo data response, the move-in buffer determines whether or not data of the pseudo data response coincides with data of the normal data response, determines that the pseudo data response is a success in case of coincidence, and determines that the pseudo data response is a failure in case of no coincidence, and
the success or the failure of the pseudo data response is notified to the re-order buffer.

5. The processor according to claim 1, wherein
the arithmetic operation circuit executes the issued instructions in an out-of-order different from a program order,
the re-order buffer executes the normal instruction execution completion process of instructions executed by the arithmetic operation circuit in an in-order that is the program order, and
the arithmetic operation circuit executes a first instruction and a second instruction after the first instruction, the second instruction having a dependent relation on the first instruction, executes the second instruction after the normal instruction execution completion process of the first instruction, and further speculatively executes the second instruction after the pseudo instruction execution completion process of the first instruction.

6. The processor according to claim 1, wherein when the normal memory request is issued by the move-in buffer, the pseudo memory request is issued by the move-in buffer.

7. The processor according to claim 1, wherein, when the normal memory request is issued by the move-in buffer, the pseudo memory request is issued by the level 2 cache.

\* \* \* \* \*